United States Patent
Mizuno et al.

(10) Patent No.: US 6,701,108 B2
(45) Date of Patent: Mar. 2, 2004

(54) NON-FIXING TYPE IMAGE FORMING METHOD AND NON-FIXING TYPE IMAGE FORMING APPARATUS

(75) Inventors: Hiroshi Mizuno, Ikoma (JP); Akira Izutani, Higashiosaka (JP)

(73) Assignee: Minolta Co., Ltd., Osaka (JP)

( * ) Notice: Subject to any disclaimer, the term of this patent is extended or adjusted under 35 U.S.C. 154(b) by 50 days.

(21) Appl. No.: 10/162,387

(22) Filed: Jun. 5, 2002

(65) Prior Publication Data
US 2002/0191983 A1 Dec. 19, 2002

(30) Foreign Application Priority Data
Jun. 5, 2001 (JP) .............................. 2001-169715

(51) Int. Cl.[7] .............................................. G03G 15/22
(52) U.S. Cl. ....................... 399/130; 399/315; 399/411
(58) Field of Search ................................ 399/127, 128, 399/130, 264, 390, 411, 397, 1, 315, 98, 400; 430/97

(56) References Cited

U.S. PATENT DOCUMENTS

| | | | | |
|---|---|---|---|---|
| 4,087,170 A | * | 5/1978 | Sawaoka et al. | 399/148 |
| 4,120,577 A | * | 10/1978 | Watanabe et al. | 399/299 |
| 5,227,844 A | * | 7/1993 | Bhattacharjee et al. | 399/99 |
| 5,781,822 A | * | 7/1998 | Nishiyama et al. | 399/1 |
| 6,076,218 A | * | 6/2000 | Taniguchi et al. | 15/102 |
| 6,150,066 A | * | 11/2000 | Kurotori et al. | 430/97 |
| 6,472,115 B2 | * | 10/2002 | Uezono et al. | 430/102 |
| 6,529,704 B1 | * | 3/2003 | Kurita et al. | 399/390 |
| 6,577,827 B2 | * | 6/2003 | Matsuura et al. | 399/45 |
| 2002/0098012 A1 | * | 7/2002 | Matsuura et al. | 399/154 |

FOREIGN PATENT DOCUMENTS

| | | | | |
|---|---|---|---|---|
| EP | 786337 A2 | * | 7/1997 | B41C/1/10 |
| JP | 6-43682 | | 2/1994 | |
| JP | 2000194167 A | * | 7/2000 | G03G/15/00 |
| JP | 2000-250249 | | 9/2000 | |
| JP | 2000352908 A | * | 12/2000 | G03G/21/00 |

* cited by examiner

*Primary Examiner*—Robert Beatty
(74) *Attorney, Agent, or Firm*—McDermott, Will & Emery

(57) ABSTRACT

In the non-fixing type image forming method and apparatus which allow chargeable toner T to removably adhere to recessed portions R of an image receiving sheet S having an uneven surface s2' formed with a lot of the recessed portions R capable of housing the chargeable toner by an electrostatic force to form a toner image and allows protrusions P of the uneven surface s2' to protect the toner T adhering to the recessed portions R, after the toner image is formed on the image receiving sheet S, an amount of electric charges of the toner T on the image receiving sheet is reduced.

21 Claims, 10 Drawing Sheets

NON-FIXING TYPE IMAGE FORMING METHOD AND NON-FIXING TYPE IMAGE FORMING APPARATUS

This application is based on application No. JP 2001-169715 filed in Japan, the contents of which is hereby incorporated by reference.

BACKGROUND OF THE INVENTION

1. Field of the Invention

The present invention relates to an image forming method and an image forming apparatus which are improved. More concretely, the present invention relates to a non-fixing type image forming method of forming a toner image on a image receiving sheet and a non-fixing type image forming apparatus to be used for carrying out the image forming method.

2. Description of the Related Art

An image forming method of forming a toner image on an image receiving sheet has been carried out for a long time. The typical method is an electrophotographic image forming method.

In the electrophotographic image formation, an electrostatic latent image carrier such as a photoreceptor is electrified so as to have a predetermined electric potential, and an image is exposed on the charging area according to document image information so that an electrostatic latent image is formed. The electrostatic latent image is developed by using a developer so that a visible toner image is obtained. Further, the visible toner image is finally transferred and fixed onto the image receiving sheet.

Alternatively, there suggest also a direct recording type image forming method of allowing toner to adhere directly to an image receiving sheet based on document image information so as to form and fix a toner image without forming an electrostatic latent image, and a similar method of once forming the toner image directly on an intermediate transfer body so as to transfer and fix the toner image onto the image receiving sheet.

In any methods, according to the conventional image forming methods, a developer which includes toner capable of being fixed onto an image receiving sheet is used. A typical example of the developer is one including hot-melt toner in which pigment or dye is mixed and dispersed in thermoplastic resin.

A toner image composed of such hot-melt toner is finally melt-fixed onto an image receiving sheet made of paper, plastic or the like by heating using a heat roller, infrared or the like. Moreover, at this time, the image receiving sheet is heated under pressure if necessary.

It is difficult to separate the toner fixed onto the image receiving sheet from the image receiving sheet and to reuse the toner and the image receiving sheet. Therefore, when an image receiving sheet onto which a toner image is fixed is unnecessary, it is discarded.

However, as the present public is computerized, a lot of the toner and the image receiving sheets are consumed, so that the energy required for producing them and an amount of exhaust carbon dioxide generated by the production are increasing.

As a method of separating toner from an image receiving sheet in order to reuse an image receiving sheet on which a toner image is fixed, a deinking method utilizing an aqueous solution such as a surface-active agent is also known, but a lot of energy is required to remove moisture impregnating with an image receiving sheet such as paper, and removed toner cannot be reused because it is vitrificated.

Therefore, Japanese Patent Application Laid-Open No. 2000-250249 suggests an image forming method of forming a toner image on an image receiving sheet, more concretely, a non-fixing type image forming method which adopts an image receiving sheet having an uneven surface where a lot of recessed portions are formed capable of housing toner, allows toner to adhere removably to the recessed portions on the uneven surface of the image receiving sheet so as to form a toner image, and protects the toner adhering to the recessed portions by protrusion on the uneven surface of the image receiving sheet so that the adhered toner image is obtained as a formed image, and a non-fixing type image forming apparatus and the like which is suitable for carrying out the image forming method.

This non-fixing type image forming method and the non-fixing type image forming apparatus hold a toner image on an image receiving sheet with the toner image being capable of removed from the image receiving sheet without fixing the toner image thereon like conventional technique so as to capable of forming an image, and separate the toner from the image receiving sheet on which the toner image is formed so as to enable reuse of the toner or (and) the image receiving sheet.

For example, in the non-fixing type image forming method and image forming apparatus suggested in Japanese Patent Application Laid-Open No. 2000-250249, in the case where chargeable toner is used as the toner, the chargeable toner is allowed to removably adhere to the recessed portions of the image receiving sheet by an electrostatic force, so that a toner image can be formed on the image receiving sheet.

However, in such non-fixing type image forming method and image forming apparatus, when the chargeable toner is allowed to adhere to the recessed portions on the uneven surface of the image receiving sheet by the electrostatic force so that the toner image is formed on the image receiving sheet, if the surface of the sheet is allowed to approach an electrostatically charged object (for example, electrostatically charged sheet or the like), the toner on the image receiving sheet is attracted to the electrostatically charged object so as to be occasionally peeled from the image receiving sheet. For example, when the image receiving sheet on which the toner image is formed is overlapped with another electrostatically charged image receiving sheet or the image receiving sheet on which the toner image is formed is filed in an electrostatically charged file, the toner is occasionally peeled from the toner image on the image receiving sheet.

OBJECTS AND SUMMARY

The present invention is made in view of these circumstances, and the object is to provide improved image forming method and image forming apparatus. More specifically, the object is to provide improved non-fixing type image forming method and image forming apparatus.

More concretely, it is an object of the present invention to provide a non-fixing type image forming method of forming a toner image on an image receiving sheet, which holds the toner image onto the image receiving sheet removably without fixing the image like conventional techniques to be capable of forming the image, and thus separates and removes the toner from the image receiving sheet on which the toner image is formed to enable reusing of the toner or (and) the image receiving sheet, and is capable of forming the toner image remaining stably on the image receiving sheet onto the image receiving sheet with a damage of the image due to an object having electric charges (for example, a sheet having electric charges) which occasionally approaches from an outside being suppressed. Further, it is an object of the present invention to provide a non-fixing type image forming apparatus which is suitable for carrying out the non-fixing type image forming method.

In order to achieve the above and another objects, the image forming method according to a certain aspect of the present invention is a non-fixing type image forming method of forming a toner image on an image receiving sheet, which adopts an image receiving sheet having an uneven surface formed with a lot of recessed portions capable of housing chargeable toner as the image receiving sheet, and allows the chargeable toner to removably adhere to the recessed portions on the uneven surface of the image receiving sheet by means of an electrostatic force to form a toner image, and allows protrusions on the uneven surface of the image receiving sheet to protect the toner adhering to the recessed portions. In this method, after the toner image is formed on the image receiving sheet, an amount of electric charges of the toner on the image receiving sheet is reduced.

Further, in the image forming method, after the toner image is formed on the image receiving sheet, a surface potential of the image receiving sheet is reduced to not more than 100 V with absolute value.

In addition, the image forming apparatus according to a certain aspect of the present invention is a non-fixing type image forming apparatus which has a toner image forming apparatus for allowing chargeable toner to removably adhere to recessed portions of an image receiving sheet having an uneven surface formed with a lot of recessed portions capable of housing the chargeable toner by means of an electrostatic force to form a toner image on the image receiving sheet. In this image forming apparatus, an electric charge reducing apparatus for reducing an amount of electric charges of the toner on the image receiving sheet after forming the toner image is provided on a downstream side in an image receiving sheet carrying direction with respect to a toner image forming area on the image receiving sheet by the toner image forming apparatus.

Preferably in the image forming apparatus, a protrusion toner removal apparatus for removing the toner adhering to top portions of protrusions on the uneven surface of the image receiving sheet is provided on the downstream side in the image receiving sheet carrying direction with respect to the toner image forming area on the image receiving sheet by the toner image forming apparatus. The electric charge reducing apparatus is provided on the downstream side in the image receiving sheet carrying direction with respect to the toner image forming area and on an upstream side with respect to the protrusion toner removal apparatus or (and) a downstream side with respect to the protrusion toner removal apparatus.

Further, the electric charge reducing apparatus includes an electrically conductive sheet which is brought into contact with a surface of the image receiving sheet on which the toner image has been formed.

In another aspect, the electric charge reducing apparatus includes an electrically conductive roller which is brought into contact with the surface of the image receiving sheet on which the toner image has been formed.

In still another aspect, the electric charge reducing apparatus is an ion generating apparatus which strews ions over the surface of the image receiving sheet on which the toner image has been formed by means of ion flow.

In still another aspect, the electric charge reducing apparatus includes a charger which faces the surface of the image receiving sheet on which the toner image has been formed.

Furthermore, the electric charge reducing apparatus reduces the surface potential of the image receiving sheet where the toner image has been formed to not more than 100 V with absolute value.

BRIEF DESCRIPTION OF THE DRAWINGS

These and other objects and features of the present invention will become apparent from the following description of preferred embodiments thereof taken in conjunction with the accompanying drawings, in which:

FIG. 8(A) shows the toner adhering state on the image receiving sheet after the toner image is transferred; and FIG. 8(B) shows the toner adhering state on the image receiving sheet after electric charges of the toner are reduced;

FIG. 9(B) shows the apparatus including an electrically conductive roller; and FIG. 9(C) shows the apparatus including an electrifying charger;

In the following description, like parts are designated by like reference numbers throughout the several drawings.

DETAILED DESCRIPTION OF THE PREFERRED EMBODIMENTS

Outline of the Embodiments

Figure 1:
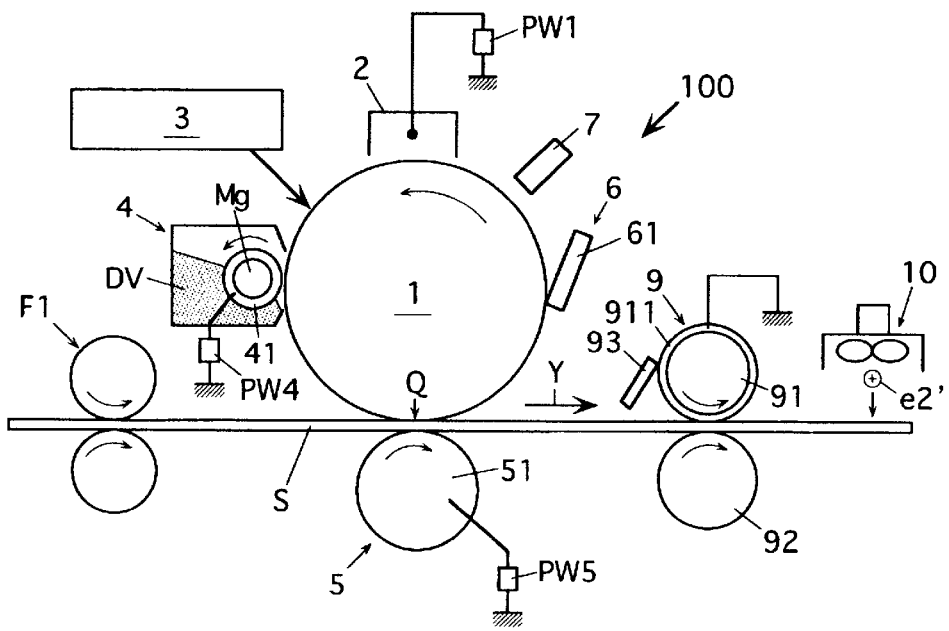
FIG. 1 is a view showing a schematic structure as one example of a non-fixing type image forming apparatus which can carry out a non-fixing type image forming method according to the present invention.

According to studies by the present inventors, in non-fixing type image formation which adopts an image receiving sheet having an uneven surface formed with a lot of recessed portions capable of housing chargeable toner, allows the chargeable toner to removably adhere to the recessed portions on the uneven surface of the image receiving sheet by an electrostatic force to form a toner image, and protects the toner adhering to the recessed portions with protrusions on the uneven surface of the image receiving sheet, when a toner image is formed on the image receiving sheet, the toner is normally supplied with electric charges prior to adhesion to the image receiving sheet. It is considered that the toner on the image receiving sheet after adhering to the image receiving sheet is held on the image receiving sheet by balance between the electric charges of the toner and electric charges supplied to the image receiving sheet at the time of transferring or the like to the image receiving sheet, for example.

However, as mentioned before, when an object having electric charges which occasionally approaches from the outside (for example, an electrostatically charged sheet or the like) is allowed to approach the surface of the image receiving sheet, the toner is attracted to the object having electric charges to be occasionally peeled off from the toner image on the image receiving sheet. It is considered that this phenomenon occurs because electrostatic attraction between the toner and the approached object having electric charges is stronger than electrostatic attraction between the toner and the image receiving sheet.

As a cause of such phenomenon, it is considered that "since the toner is normally supplied with sufficient electric charges prior to adhesion to the image receiving sheet and has electric charges which exceeds an electric charge required for electrostatic attraction (adhesion force) with the image receiving sheet, the electrostatic attraction between the toner and the approached object having electric charges is stronger than the electrostatic attraction due to the electric charges of the toner and the electric charges of the image receiving sheet so that the toner is attracted to the object by the electric charges which exceeds the electric charges required for the electrostatic attraction (adhesion force) with the image receiving sheet".

Therefore, the present inventors have found out the following. Namely, the unnecessary electric charges of which amount exceeds the electric charges required for the electrostatic attraction (adhesion force) between the toner and the image receiving sheet are eliminated or reduced by discharge or the like, so that the electric charges of the toner hardly reacts to the object having electric charges which approaches the image receiving sheet externally.

Based on the above knowledge, the present invention provides the following non-fixing type image forming method and the non-fixing type image forming apparatus.

(1) Non-fixing Type Image Forming Method

A non-fixing type image forming method of forming a toner image on an image receiving sheet, in which an image receiving sheet having an uneven surface formed with a lot of recessed portions capable of housing chargeable toner is adopted as the image receiving sheet, the chargeable toner is allowed to removably adhere to the recessed portions on the uneven surface of the image receiving sheet by an electrostatic force to form a toner image, and the toner adhering to the recessed portions is protected by protrusions on the uneven surface of the image receiving sheet, the method is characterized by reducing an amount of electric charges of the toner on the image receiving sheet after the toner image is formed on the image receiving sheet.

According to the non-fixing type image forming method of the present invention, the image receiving sheet having the uneven surface formed with a lot of recessed portions capable of housing chargeable toner is used as an image receiving sheet on which an image is formed, and the chargeable toner is allowed to removably adhere to the recessed portions on the uneven surface of the image receiving sheet to form a toner image. The toner adhering to the recessed portions is protected by the protrusions on the uneven surface of the image receiving sheet.

Therefore, although the formed toner image is allowed to only adhere to the image receiving sheet and is not made a fixing treatment by heating or the like which is carried out in the conventional image forming methods, the toner in the recessed portions is protected sufficiently as long as a particular external force or a toner removal action is not added, so that a required toner image state can be maintained. In the case where the toner image on the image receiving sheet is viewed and the image receiving sheet is kept and simply moved, a weak external force due to contact between image receiving sheets or light contact between fingers and an image receiving sheet is applied, but inconvenience such that remarkable disorder of a toner image or adhesion of toner to a rear face of an image receiving sheet on which is overlapped is not ocurred.

Furthermore, since the toner only adheres to the image receiving sheet removably, the toner can be separated from the image receiving sheet, and the toner which is separated and removed or (and) the image receiving sheet from which the toner has been removed can be reused.

In addition, according to the non-fixing type image forming method of the present invention, the chargeable toner which can be fixed, for example, hot-melt toner which can be thermally fixed, is not necessary to use. Therefore, a hard material can be used as a toner material, and thus long-life toner with less deformation, friction and fusing can be adopted.

Further, since an amount of electric charges of the toner on the image receiving sheet on which the toner image is formed is reduced, electric charges of which amount exceed electric charges required for the electrostatic attraction (adhesion force) between the toner and the image receiving sheet can be eliminated or reduced. As a result, the electric charges of the toner hardly reacts to an object having electric charges which approaches the image receiving sheet from the outside. For example, even if the image receiving sheet on which the toner image is formed is overlapped with another electrostatically charged image receiving sheet or the image receiving sheet on which the toner image is formed is filed in an electrostatically charged file, the toner is hardly peeled off from the toner image on the image receiving sheet.

According to the non-fixing type image forming method of the present invention, the toner image is not fixed onto the image receiving sheet unlike the conventional technique, the toner is held removably from the image receiving sheet, so that the image can be formed. As a result, the toner is removed from the image receiving sheet on which the toner image is formed so that the toner or (and) the image receiving sheet can be reused. Moreover, in the state where damage of the image due to the object having electric charges (for example, a sheet having electric charges) which possibly approaches from the outside is suppressed, the toner image which remains stably on the image receiving sheet can be formed on the image receiving sheet.

In the non-fixing type image forming method of the present invention, a surface potential of the image receiving sheet where the toner image is formed and an amount of electric charges of the toner is reduced, is preferably close to 0V (a potential in a state that the electric charges of the toner on the image receiving sheet is balanced with the electric charges of the image receiving sheet), and the surface potential of the image receiving sheet can be, for example, about not more than 100 V with absolute value.

As the chargeable toner, chargeably non-magnetic toner or a chargeably magnetic toner can be used.

In the non-fixing type image forming method of the present invention, the forming of the toner image on the image receiving sheet can adopt an electrophotographic method accompanying conventional forming of an electrostatic latent image, the above-mentioned direct recording system or the like.

In any method, in order to reuse a sheet or the like, chargeable toner can be separated and removed from an image receiving sheet by utilizing the electrostatic force. Moreover, when chargeably magnetic toner is used, the toner can be separated and removed from the image receiving sheet easily and securely by using the electrostatic force and magnetic force. Mechanical scraping using a brush or the like can be used.

When the toner image is formed on the image receiving sheet, the toner possibly adheres also to top portions of the protrusions on the uneven surface of the image receiving sheet, but the toner which adheres to the top portions of the protrusions on the uneven surface of the image receiving sheet maybe removed as the need arises.

In the case where the toner which adheres to the top portions of the protrusions on the uneven surface of the image receiving sheet is removed, after the toner image is formed on the image receiving sheet, an amount of the electric charges of the toner on the image receiving sheet may be reduced before and (or) after the toner is removed from the top portions of the protrusions on the uneven surface of the image receiving sheet.

When the toner is removed from the top portions of the protrusions on the uneven surface of the image receiving sheet, the protrusions may be electrified by the same polarity as the electrifying polarity of the toner in order to facilitate the removal of the toner.

In addition, the toner which adheres to the top portions of the protrusions on the uneven surface of the image receiving sheet may be removed in such a manner that a protrusion clearing rotary body in which a local electrostatic field of a fine pattern and (or) a local electrostatically magnetic field is dispersed to be formed on its surface, is brought into contact with or is allowed to approach the top portions of the protrusions, and the toner adhering to the protrusions is attracted to the cleaning rotary body.

In the case where the protrusion cleaning rotary body is adopted, the protrusion cleaning rotary body, in which the local electrostatic field and (or) the local electrostatically magnetic field of the fine pattern is dispersed to be formed on its surface, is brought into contact with or is allowed to approach the top portions of the protrusions according to whether the using toner is the chargeable toner or the chargeably magnetic toner, so that the toner which adheres to the protrusions is attracted to the cleaning rotary body to be removed.

(2) Non-fixing Type Image Forming Apparatus

In the non-fixing type image forming apparatus which has a toner image forming apparatus for allowing chargeable toner to removably adhere to recessed portions of an image receiving sheet having an uneven surface formed with a lot of the recessed portions capable of housing the chargeable toner to be used for forming of a toner image by an electrostatic force to form a toner image on the image receiving sheet, the non-fixing type image forming apparatus is characterized by providing with an electric charge reducing apparatus, which reduces an amount of electric charges of the toner on the image receiving sheet after the toner image is formed, on a downstream side in an image receiving sheet carrying direction with respect to a toner image forming area on the image receiving sheet by the toner image forming apparatus.

According to this image forming apparatus, the non-fixing type image forming method of the present invention can be carried out.

In addition, the image forming apparatus of the present invention may be provided with a protrusion toner removal apparatus, which removes toner adhering to top portions of the protrusions on the uneven surface of the image receiving sheet, on the downstream side in the image receiving sheet carrying direction with respect to the toner image forming area on the image receiving sheet by the toner image forming apparatus.

In the image forming apparatus of the present invention, in the case where the protrusion toner removal apparatus, which removes the toner adhering to the top portions of the protrusions on the uneven surface of the image receiving sheet, is provided on the downstream side in the image receiving sheet carrying direction with respect to the toner image forming area on the image receiving sheet by the toner image forming apparatus, the electric charge reducing apparatus may be provided on the downstream side with respect to the toner image forming area in the image receiving sheet carrying direction and on an upstream side with respect to the protrusion toner removal apparatus or (and) on the downstream side with respect to the protrusion toner removal apparatus.

In the image forming apparatus, after the toner image is formed on the image receiving sheet, an amount of the electric charges of the toner on the image receiving sheet can be reduced before or (and) after the toner is removed from the top portions of the protrusions on the uneven surface of the image receiving sheet.

At any rate, examples of the electric charge reducing apparatus are an apparatus including an electrically conductive sheet (including a film type sheet) which is brought into contact with the surface of the image receiving sheet, an apparatus including an electrically conductive roller which is brought into contact with the surface of the image receiving sheet, an ion generating apparatus for strewing ions over the surface of the image receiving sheet by ion flow, an apparatuses including a charger which faces the surface of the image receiving sheet, an apparatus which includes a non-contact type charger such as a corona discharge device using an electrically conductive wire or the like, an apparatus which includes a contact charger using an electrically conductive brush, an electrically conductive sheet, an electrically conductive roller or the like.

According to such an electric charge reducing apparatus, for example, the electric charge reducing apparatus is brought into contact with or non-contact with the image receiving sheet on which the toner image is formed, and the electric charges are released from the toner by the electric charge reducing apparatus or electric charges having opposite polarity to the electrifying polarity of the toner are supplied to the image receiving sheet from the electric charge reducing apparatus so that an amount of the electric charges of the toner can be reduced.

When the apparatus including the electrically conductive sheet or the apparatus including the electrically conductive roller is used as the electric charge reducing apparatus and the electrically conductive sheet or the electrically conductive roller is brought into contact with the image receiving sheet on which the toner image has been formed, the electrically conductive sheet or the electrically conductive roller is electrically grounded so that the toner electric charges can be released (discharged).

In the non-fixing type image forming apparatus of the present invention, the surface potential of the image receiving sheet where the toner image is formed and an amount of the electric charges of the toner is reduced is preferably close to 0V (electric potential in the state where the electric charges of the toner on the image receiving sheet is balanced with the electric charges of the image receiving sheet). As the electric charge reducing apparatus, there can exemplify an apparatus which reduces the surface potential of the image receiving sheet on which the toner image has been formed to not more than 100 V with absolute value, for example.

In addition, the image forming apparatus may have the toner separation/removal apparatus which is provided on the upstream side in the image receiving sheet carrying direction with respect to the toner image forming area on the image receiving sheet by the toner image forming apparatus and which separates to remove the toner from the image receiving sheet to be carried to the toner image forming area. In this case, as for the image receiving sheet which is carried to the toner image forming area on the image receiving sheet by the image receiving apparatus, when the toner image has been formed on the image receiving sheet, before the stage of going into the area, the toner is separated to be removed by the toner separation/removal apparatus so that a toner image can be again formed on the image receiving sheet from which the toner has been removed. The toner which is separated and removed can be reused if desirable. In such a manner, the image receiving sheet and the toner can be recycled.

As the chargeable toner, for example, chargeable magnetic toner may be used. When the chargeable magnetic toner is used, the toner can be separated and removed from the image receiving sheet easily and securely by using the electrostatic force and the magnetic force.

The image forming apparatus can adopt various types of toner image forming apparatuses.

An example of the toner image forming apparatus is an apparatus which has a section for forming a toner image on an image carrier according to document image information and a transfer apparatus for electrostatically transferring the toner image onto the image receiving sheet.

The toner separation/removal apparatus is not limited, but at least an apparatus which separates and removes toner from an image receiving sheet by using a mechanical force can be used.

An example of the toner separation/removal apparatus using the mechanical force is at least an apparatus including a brush apparatus sliding along the surface of the image receiving sheet.

According to the toner separation/removal apparatus including the brush apparatus, the brush apparatus slides on the image forming surface of the image receiving sheet and brushes off the toner along the recessed portions of the image receiving sheet so that the toner can be removed from the image receiving sheet.

Such a brush apparatus may be composed of, for example, a fiber brush or a magnetic brash (for example, magnetic brush roller). The brush apparatus maybe composed of the combination of them.

The image forming apparatus of the present invention may have an apparatus for supplying the toner separated to be removed from the toner separation/removal apparatus to the toner image forming apparatus. In this case, when the toner image forming apparatus includes a developing apparatus, the toner can be supplied to the developing apparatus.

When the toner image forming apparatus includes the developing apparatus, the developing apparatus may serve also as at least a part of the toner separation/removal apparatus.

An example of the protrusion toner removal apparatus is as follows:

(i) an apparatus having an electrifying apparatus for electrifying the protrusions on the uneven surface of the image receiving sheet with the same polarity as the electrifying polarity of the toner;

(ii) an apparatus which includes a protrusion cleaning rotary body, which is provided so as to contact with or close to the protrusions on the uneven surface of the image receiving sheet carried from the toner image forming area and of which local electrostatic field forming section is formed on its surface, and an electrifying apparatus which electrifies the local electrostatic field forming section of the protrusion cleaning rotary body to disperse and form a local electrostatic field of a fine pattern for allowing the toner adhering to the top portions of the protrusions of the image receiving sheet to be attracted to the surface of the protrusion cleaning rotary body; and (iii) an apparatus which includes a protrusion cleaning rotary body which is provided so as to contact with or closed to the protrusions on the uneven surface of the image receiving sheet carried from the toner image forming area and of which local electrostatically magnetic field of a fine pattern is dispersed and formed on its surface.

At any rate, the image forming apparatus of the present invention may have an apparatus for supplying toner removed from the protrusion toner removal apparatus to the toner image forming apparatus. In this case, when the toner image forming apparatus includes a developing apparatus, toner can be supplied to the developing apparatus.

The image receiving sheet which is used in the non-fixing type image forming method and image forming apparatus of the present invention is for allowing chargeable toner to removably adhere to the image receiving sheet to form a toner image. The image receiving sheet has the uneven surface formed with a lot of recessed portions capable of housing the chargeable toner, and is such that the chargeable toner is allowed to removably adhere to the recessed portions by means of the electrostatic force so that the toner image is formed and the toner which has been adhered to the recessed portion can be protected by the protrusions on the uneven surface of the image receiving sheet.

The image receiving sheet can be formed by various materials such as paper, synthetic resin and the combination of them.

As for the uneven surface of the image receiving sheet, the recessed portions and the protrusions are dispersed to be formed approximately uniformly, a total area of the recessed portions is larger than a total area of the protrusions on the uneven surface, and each recessed portion is deeper and wider than the toner size to be capable of housing a plurality of toners therein.

The recessed portions and the protrusions may be formed regularly.

The image receiving sheet is generally desirably constituted so that the recessed portions and the protrusions on the surface have a size not to remarkably deteriorate an image quality of the toner image to be formed, and size, shape and strength of the recessed portions and the protrusions including width and height of the protrusions and width and depth of the recessed portions (in other words, the height of the protrusions) are such that the toner adhering to the recessed portions can be protected sufficiently against an external force. Moreover, it is desired that the image receiving sheet can be produced at the cost as low as possible, and is safe for environment, and its appearance and touch are satisfactory.

A typical example of the whole shape of the image receiving sheet is rectangle (square or oblong), but the shape is not limited to this, and the other shapes may be acceptable.

The shape of the uneven surface of the image receiving sheet (uneven pattern) is not limited to the above one, but, for example, a shape which includes a lot of linear protrusions (protrusion bar portions) which are arranged parallel with each other with a predetermined interval, in other words, a shape which is formed with a lot of continuous groove type recessed portions may be acceptable.

The shape of the uneven surface of the image receiving sheet may be such that a lot of columnar protrusions having predetermined sectional shape are arranged into a predetermined pattern. In this case, the portions where the protrusions are not formed are recessed portions. In other words, a lot of recessed portions occasionally result in one continuos recessed portion. The sectional shape of such a protrusion may be circular, for example, but it is not limited to this and may be non-circular.

For example, in the case where the uneven surface has a shape such that a lot of continuos groove type recessed portions are formed, the protrusion bar portions along the continues groove type recessed portions preferably have a width of not more than ½ to not less than 1/50 of the width of the continues groove type recessed portions.

The sizes of the respective portions on the uneven surface of the image receiving sheet may be determined taking the size of the toner to be used for forming the toner image on the image receiving sheet into consideration. As mentioned later, the toner which has an average particle diameter of about 2 $\mu$m to 30 $\mu$m, for example, can be adopted. The recessed portion may have a width which is capable of housing a plurality of toner particles, for example. The height of the protrusion (depth of the recessed portion) is preferably larger than the average particle diameter of the toner to be used. When the height of the protrusion (depth of the recessed portion) is smaller than the average particle diameter of the toner, it is difficult to protect the toner which adheres to the recessed portions by means of the protrusions. The width of the recessed portions (interval of the adjacent protrusions) is preferably not less than twice as large as the average particle diameter of the toner, for example.

Although depending on the size of the toner or the like, the sizes of the respective portions on the uneven surface of the image receiving sheet can be as follows.

The height of the protrusions (the depth of the recessed portions) can be, for example, about 5 $\mu$m to 150 $\mu$m, preferably about 20 $\mu$m to 100 $\mu$m.

Although depending on the shape or the like of the protrusions, the width and the diameter of the protrusions can be about 0.5 $\mu$m to 30 $\mu$m, for example.

Although depending on the shape or the like of the recessed portions, the width of the recessed portions (interval between the adjacent two protrusions) can be about 20 $\mu$m to 500 $\mu$m. In the case where the uneven surface of the image receiving sheet includes the lattice protrusions as mentioned above, an interval between adjacent linear portions extending to a first direction in the lattice protrusions may be the same as or different from an interval between adjacent linear portions extending to a second direction (direction which crosses the first direction). For example, the interval between the linear portions extending to the first direction in the lattice-shaped protrusions may be about 20 $\mu$m to 500 $\mu$m, and the interval between the linear portions extending to the second direction may be larger than 500 $\mu$m (for example, about 1 mm to 100 mm). In this case, the toner in the recessed portions can be protected mainly by the linear portions which extend to the first direction.

The image receiving sheet can be formed by various materials such as paper, synthetic resin (polyester, polyethylene terephthalate, polyolefin (polypropylene, polyethylene or the like), polyimide, polyamide or the like) and the combination of them. The material is not limited to them, but for example, the single synthetic resin (thermoplastic resin such as polyethylene, acrylic, polyester) or a layer of a surface layer material obtained by kneading white such as titanium oxide, zinc oxide, silica, alumina, clay or talc, or body color with the resin is provided on a sheet core layer made of paper or the like, and the obtained substance is molded by a mold (for example, master roller) formed with a pattern capable of forming predetermined recessed portions, so that the uneven surface is formed. The image receiving sheet may be formed by molding such that the resin is poured into the mold.

In addition, there exist a method of forming a polymer film which is used as a so-called resist on a sheet core layer, and exposing this via a light shielding mask for obtaining predetermined recessed portions to remove portions corresponding to the recessed portions, and more concretely, a method of forming a film of a photopolymer on the sheet core layer, and exposing this via a light shielding mask of which portions corresponding to the protrusions are opened in order to obtain predetermined recessed portions to remove portions corresponding to the recessed portions by rinsing or the like.

In addition, the surface layer of an image receiving sheet is cut by a dicing saw or a precision cutting tool, so that the predetermined recessed portions may be formed.

In any way, if the toner is attracted strongly and it is charged so that the removal of the toner possibly becomes difficult, a pigment (for example, white) having a semiconductor property, titanium oxide, zinc oxide or the like may be kneaded with a surface layer material.

Further, the sheet core layer may be, for example, an electrically conductive layer having a resistance value of about $10^4$ $\Omega$·cm to $10^{10}$ $\Omega$·cm, and the surface layer (uneven layer) having the recessed portions may be an insulating layer (for example, $10^{12}$ $\Omega$·cm or more). This facilitates the transfer of the toner image onto the image receiving sheet utilizing the electrostatic force and the removal of the toner from the image receiving sheet utilizing the electrostatic force. Moreover, this is advantageous also in view of obtaining the toner holding force.

A volume ohmic value or a surface ohmic value of the rear face opposite to the recessed portions of the image receiving sheet may be controlled by adding a surfactant or applying coating.

In addition, the surface having the recessed portions of the image receiving sheet, particularly the protrusions or only the protrusions or at least the top portions of the protrusions may be coated with die lubricant such as fluorine plastic so that the removal of the adhering toner may be facilitated.

The image receiving sheet maybe of a continuous type, a continuous foldable type, a cut-formed type or the like.

In addition, the whole image receiving sheet may be transparent.

As for the developer, various developers including toner capable of being used for the non-fixing type image forming method and the non-fixing type image forming apparatus of the present invention can be considered.

As such a developer, a so-called single-component developer or a two-component developer containing particles corresponding to toner and carrier can be used. In the case where the two-component developer is adopted, not a two-component developer requiring a conventional fixing process but a two-component developer having magnetic toner and non-magnetic particles corresponding to carrier is used. In this case, if the non-magnetic particles adhere to the image receiving sheet, when transparent particles or particles having the same color as the surface of the image receiving sheet (for example, when the image receiving sheet is white, white particles) are used as the particles, there is no obstruction.

When a two-component developer containing chargeable magnetic toner and particles corresponding to non-magnetic carrier is used, in order to separate the toner from the image receiving sheet utilizing the electrostatic force, an alternate bias (in other words, an oscillating bias) (for example, AC bias) maybe applied to be superposed on the electrostatic force. When the alternate bias (oscillating bias) is applied, the separation of the toner is facilitated by an oscillation collision effect of the chargeable non-magnetic particles.

From the above viewpoint, an example of the developer containing the toner capable of being used for the non-fixing type image forming method and the non-fixing type image forming apparatus of the present invention can be a developer which is obtained by mixing colored chargeable magnetic toner with chargeable transparent or (and) white particles having the electrifying polarity opposite to the electrifying polarity of the colored chargeable magnetic toner.

The colored chargeable magnetic toner is not particularly limited, but toner containing ferromagnetic ferrite powder as a magnetic material can be used.

In addition, as the transparent or (and) white particles, particles of organic compound or inorganic compound having a contact electrifying property opposite to the polarity of the toner can be used.

Although any developer is adopted, the average particle diameter of the toner is about 2 $\mu$m to 30 $\mu$m, more preferably about 5 $\mu$m to 30 $\mu$m. When a high-definition image is reproduced, the average particle diameter is about 2 $\mu$m to 9 $\mu$m, more preferably about 5 $\mu$m to 9 $\mu$m. When the average particle diameter of the toner exceeds 30 $\mu$m, the resolution of an image is lowered. When the average particle diameter is less than 2 $\mu$m, the separating property from the image receiving sheet is deteriorated. Therefore, the particle diameter in the above range is preferable.

Also in the case where the developer, which is obtained by mixing the colored chargeable magnetic toner with the chargeable transparent or (and) white particles, is used as mentioned above, the average particle diameter of the colored chargeable magnetic toner is preferably in the above range, and similarly to this toner, the average particle diameter of the transparent or (and) white particles is about 2 $\mu$m to 30 $\mu$m, more preferably 5 $\mu$m to 30 $\mu$m.

Concrete Embodiments

There will be explained below the embodiments of the present invention with reference to the drawings.

FIG. 1 shows a schematic structure as one example of the non-fixing type image forming apparatus which can carry out the non-fixing type image forming method of the present invention.

The image forming apparatus shown in FIG. 1 includes a toner image forming apparatus 100. The toner image forming apparatus 100 has a photoreceptor 1 as an electrostatic latent image carrier. Around the photoreceptor 1, an electrifying charger 2, an image exposing apparatus 3, a developing apparatus 4, a transfer apparatus 5, a cleaning section 6 and a destaticizer 7 are arranged in this order.

In the drawing, a sheet carrying roller pair F1 is provided on the left side of the developing apparatus 4, and an image receiving sheet supply section is provided on the left side thereof. The image receiving sheet supply section can house cut-formed image receiving sheets S, and can draws out the image receiving sheets S one by one to be capable of feeding the image receiving sheets S drawn out of the image receiving sheet supply section to the sheet carrying roller pair F1.

At the time of forming an image, the photoreceptor 1 is driven to rotate to a counterclockwise direction in the drawing by a drive device, not shown.

A predetermined DC voltage is applied from a power source PW1 to the electrifying charger 2, and the electrifying charger 2 can electrify the surface of the photoreceptor 1 which is driven to rotate uniformly with a predetermined electric potential (here, about −900 V).

The image exposing apparatus 3 exposes an image on an area of the photoreceptor 1 electrified by the electrifying charger 2 according to image information to form an electrostatic latent image. At this time, the surface potential of the photoreceptor 1 is attenuated to about −100 V in the exposed area and is maintained in about −900 V in the unexposed area.

As the image exposing apparatus, an apparatus which includes a scanner for optically scanning a document image to expose the image on the photoreceptor 1 may be used.

The developing apparatus 4 has a magnetic roller Mg having magnetism and a developing roller 41 externally fitted to the magnetic roller Mg, and the developing roller 41 is driven to rotate to the counterclockwise direction in the drawing by the drive device, not shown. Moreover, a predetermined DC developing bias (here, −350 V) is applied from a power source PW4 to the developing roller 41. As a result, the electrostatic latent image on the photoreceptor 1 can be developed.

A developer DV to be used for the development is not limited, but a developer DV, which is obtained by mixing black negatively chargeable toner with magnetic particles having contact electrifying property (positively electrifying property) as carrier, is frequently used. An average particle diameter of the toner is about 2 $\mu$m to 30 $\mu$m, or about 5 $\mu$m to 30 $\mu$m, but here approximately 10 $\mu$m.

Since the above described the particle diameter of the toner or the like, unevenness of the image receiving sheet which relates to the particle diameter will be explained here.

Figure 2:
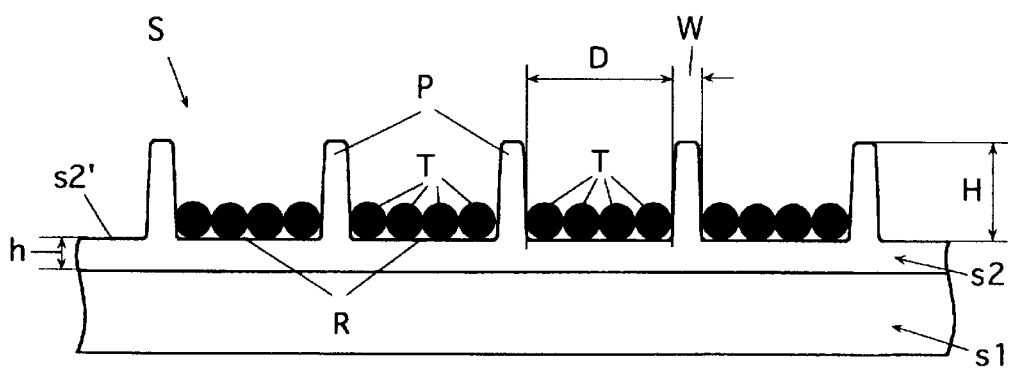
FIG. 2 is an enlarged sectional view showing one portion of an image receiving sheet.

The image receiving sheets S are not limited, but here as shown in FIG. 2, an uneven layer s2 made of synthetic resin is formed on one side of a sheet core layer s1, and the entire sheet is white. In the drawing, T shows toner in an enlarged form.

As a pattern of the unevenness, as shown in FIGS. 3(A) to 3(F), a pattern in which continuous groove type recessed portions R are provided regularly with a predetermined gap is adopted. The gaps between the adjacent groove type recessed portions R are protrusions P which extend along the groove type recessed portions R.

Figure 3:
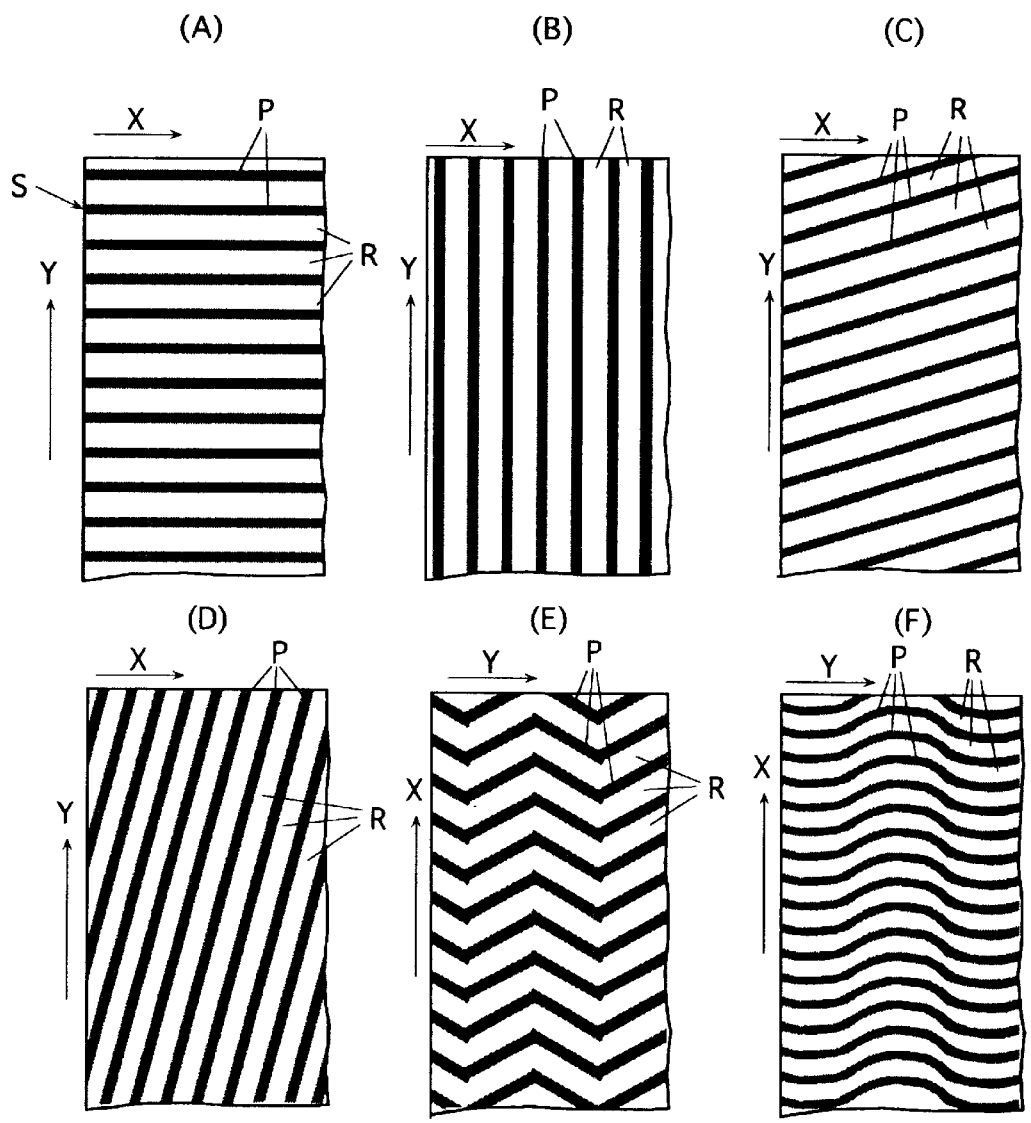
FIGS. 3(A) through 3(F) are views showing uneven patterns of the image receiving sheet.

On the sheet shown in FIG. 3(A), the recessed portions R and the protrusions P are formed parallel with a direction X which intersects perpendicularly to a sheet carrying direction Y. On the sheet shown in FIG. 3(B), the recessed portions R and the protrusions P are formed parallel with the sheet carrying direction Y. On the sheet shown in FIG. 3(c), the recessed portions R and the protrusions P are formed parallel with the direction X intersecting perpendicularly to the sheet carrying direction Y at a slightly tilted angle. On the sheet shown in FIG. 3(D), the recessed portions R and the protrusions P are formed parallel with the sheet carrying direction Y at a slightly tilted angle. On the sheets shown in FIGS. 3(E) and 3(F), the recessed portions R and the protrusions P are formed parallel in a wave shape. In FIG. 3(E), they are formed into a wave form extending in a zig-zag pattern to the sheet carrying direction Y, and in FIG. 3(F), they are formed into a wave form extending to the sheet carrying direction Y smoothly. The sheet carrying direction Y is a direction to which the sheets are fed when an image is formed on the image receiving sheet S and the toner is separated to be removed from the image receiving sheet S as mentioned later.

Figure 4:
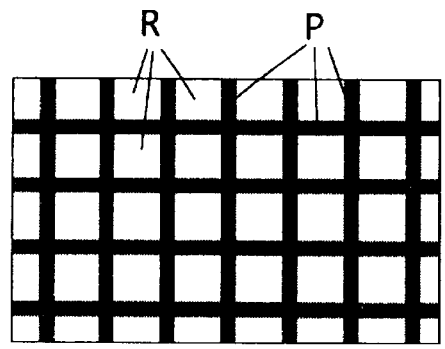
FIGS. 4(A) through 4(D) are views showing uneven patterns of the image receiving sheet.
Figure 4:
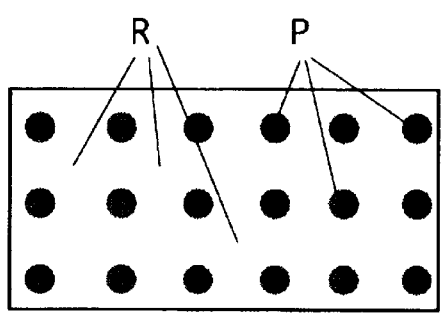
Figure 4:
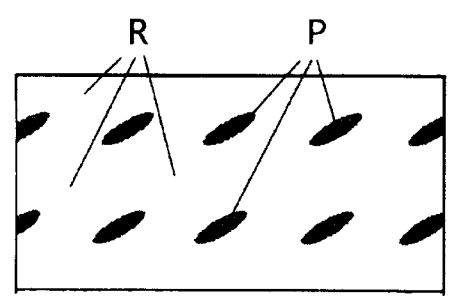
Figure 4:
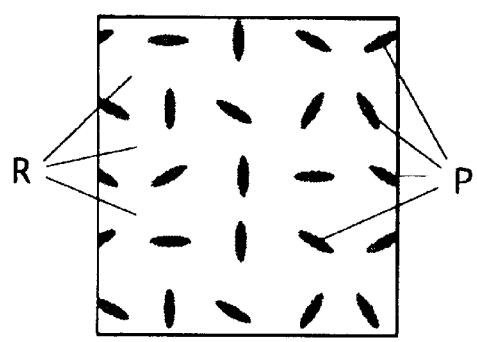

In addition, examples of the uneven pattern are a pattern which is composed of the recessed portions R and the protrusions P which surround the recessed portions and where the recessed portions R are dispersed to be formed as shown in FIG. 4(A), a pattern in which protrusions are formed with a suitable interval in the middle of the continuous groove type recessed portions, a pattern in which the protrusions P having circular section are dispersed to be formed uniformly and areas surrounded by the protrusions are the recessed portions R as shown in FIG. 4(B), a pattern in which instead of the protrusions having circular section, in the pattern of FIG. 4(B), the protrusions P having non-circular section (oval or the like) are adopted as shown in FIG. 4(C), and a pattern in which in the pattern of FIG. 4(C), the protrusions having non-circular section are provided in an uncertain direction but they are dispersed to be formed uniformly as shown in FIG. 4(D). Although depending on the size, shape and the like of the protrusions, the pattern of FIG. 4(D) can control the coming of the protrusions into the recessed portions to suppress disorder of the toner image when the image receiving sheets are overlapped with each other so that their toner image formed surfaces face each other.

Here, the uneven pattern shown in FIG. 3(B) is adopted.

Details of the image receiving sheet S are described below.

A thermoplastic resin (high-density polyethylene resin) sheet is overlapped on the sheet core layer s1 made of paper, and a shaping die is further overlapped so as to contact with the resin side. They are sandwiched by a metal plate to be pressed (pressed for 30 minutes at temperature of 150° C., under pressure of $9.80665 \times 10^5$ Pa (10 kgf/cm$^2$)). Thereafter, they are cooled, and the sheet core layer s1, the polyethylene resin sheet and the shaping die are separated so that the surface shape of the shaping die is transferred onto the polyethylene resin sheet, and the image receiving sheet S is produced. In this image receiving sheet S, an uneven surface s2' having uneven shape made of polyethylene resin is formed on the paper sheet s1.

In FIG. 2, the continuous groove type recessed portions R on the uneven surface s2' formed by the uneven layer s2 have a width D of, for example, 20 μm to 500 μm, but here, approximately 100 μm. A height H of the protrusions P (in other words, a depth of the recessed portions) is about 20 μm to 100 μm, but here approximately 60 μm. Moreover, a width W of the protrusions P is, for example, about not more than ½ to not less than ⅕₀ of the width D of the recessed portions, but here approximately 15 μm. Moreover, a minimum thickness of the uneven layer s2 (a thickness of a recessed bottom section of the uneven layer s2) h is, here, about 10 μm.

In addition, epoxy resin was poured into a shaping die made of a silicone rubber material and a sheet s1 coated with resin was overlapped thereon, and they were sandwiched by a metal plate and was left for a long time. Thereafter, the metal plate was removed, so that the image receiving sheet S was produced. As for this image receiving sheet S, the uneven surface s2' having uneven shape is formed by epoxy resin.

As for this image receiving sheet S, a width D of the continuous groove type recessed portions R on the uneven surface s2' formed by the uneven layer s2 is approximately 150 μm, a height H of the protrusions P (in other words, a depth of the recessed portions) is approximately 50 μm and a width W of the protrusions P is approximately 20 μm. Moreover, a minimum thickness of the uneven layer s2 (a thickness of a bottom surface section of the recessed portions on the uneven layer s2) is about 15 μm.

Besides them, the image receiving sheet S having the similar uneven surface s2' of the uneven shape can be produced by letting a sheet, in which a polyethylene resin film is laminated on the paper s1, through between a heated shaping roller die having a roller shape and a countered roller.

Again as for the image forming apparatus, the sheet carrying roller pair F1 can carry the image receiving sheet S drawn out of the image receiving sheet supply section, not shown, to the transfer apparatus 5.

The transfer apparatus 5 includes a transfer roller 51 here. When a toner image is transferred from the photoreceptor 1 to the image receiving sheet S, the transfer roller 51 is driven to rotate to the clockwise direction in the drawing by the drive device, not sown, and a DC transfer voltage (here, about +1 kV) is applied from a power source PW5. As a result, toner particles on the photoreceptor 1 can be transferred onto the image receiving sheet S carried to the transfer apparatus 5 by the sheet carrying roller pair F1.

Figure 5:
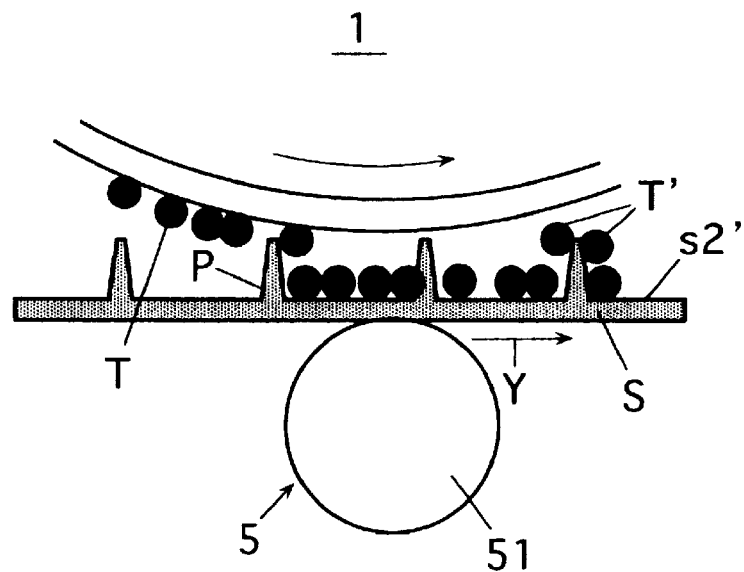
FIG. 5 is a view showing a state where toner particles on a photoreceptor are transferred onto the image receiving sheet carried to a transfer apparatus.

FIG. 5 shows the state where the toner particles on the photoreceptor 1 are transferred onto the image receiving sheet S carried to the transfer apparatus 5. The image receiving sheet S has, as mentioned above, the uneven pattern shown in FIG. 3(B), namely, the recessed portions R and the protrusions P are formed parallel with the sheet carrying direction Y, but in order to clarify the explanation, FIG. 5 shows the image receiving sheet having the uneven pattern shown in FIG. 3(A), namely, in which the recessed portions R and the protrusions P are formed parallel with the direction X intersecting perpendicularly to the sheet carrying direction Y instead of the image receiving sheet of FIG. 3(B). The same image receiving sheet is shown also in FIGS. 6 and 10, mentioned later.

The cleaning section 6 shown in FIG. 1 includes a cleaning blade 61, and the cleaning blade is arranged so as to contact with the photoreceptor 1. As a result, transfer residual toner on the photoreceptor 1 which has not been transferred onto the image receiving sheet S can be removed.

The destaticizer 7 can emit a light to the photoreceptor 1 to destaticize electric charges on the photoreceptor 1 with the light.

In addition, in the image forming apparatus, a protrusion toner removal apparatus 9 is provided on the right side of the cleaning section 6 in FIG. 1, and an electric charge reducing apparatus 10 is provided on the right side thereof.

The protrusion toner removal apparatus 9 shown in FIG. 1 includes a protrusion cleaning roller 91 provided on an upper side with respect to an image receiving sheet carrying path, a counter roller 92 provided on a lower side, and a blade 93 which scrapes off toner or the like on the roller 91. Instead of the roller 91, a rotary belt, a roller with toner removal protrusion, a rotary belt with toner removal protrusion or the like may be adopted.

Figure 6:
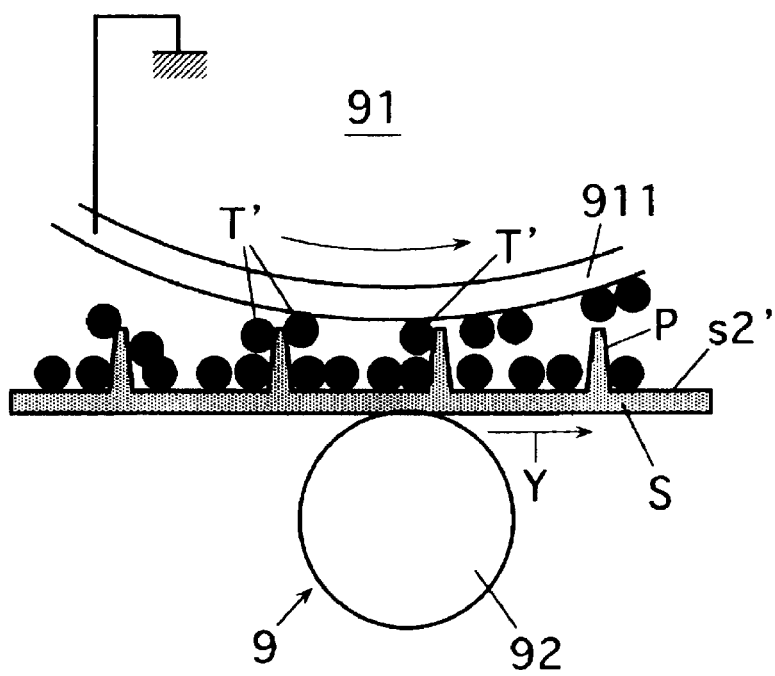
FIG. 6 is a view showing a state where the toner particles adhering to protrusions of the image receiving sheet on which the toner image is transferred are collected by a protrusion cleaning roller.

FIG. 6 shows the state where toner particles T' which adhere to protrusions P on the uneven surface s2' of the image receiving sheet S on which the toner image is transferred are collected by the protrusion cleaning roller 91. For easy understanding, FIG. 6 shows the protrusion cleaning roller 91 in the enlarged form.

As shown in FIG. 6, the protrusion cleaning roller 91 is made of metal with a smooth surface, and a metal portion 911 of the surface is electrically grounded. The roller 91 is driven to rotate to the counterclockwise direction in the drawing by a drive device, not shown. The surface moving direction of the roller 91 is the same as the surface moving direction of the image receiving sheet S, and a peripheral velocity of the roller 91 is set to be slightly faster than a carrying speed of the image receiving sheet S. As a result, the toner particles T' which adhere to the protrusions P on the uneven surface s2' of the image receiving sheet S on which the toner image has been transferred can be collected to the roller 91 by a mirror image force to be peeled from the protrusions P.

The blade 93 shown in FIG. 1 is made of a rubber material and press-contacts with the protrusion cleaning roller 91. Accordingly, the toner collected by the protrusion cleaning roller 91 can be scraped off, and thus the clean surface of the metal portion 911 of the roller 91 can always contact with the image receiving sheet S.

The electric charge reducing apparatus 10 is an ion generating apparatus which strews ions by means of ion flow, and it is provided on the downstream side with respect to the protrusion toner removal apparatus 10 in the image receiving sheet carrying direction Y. The electric charge reducing apparatus 10 will be detailed later.

On the right side of the electric charge reducing apparatus 10 in the drawing, a discharge tray, not shown, which houses the image receiving sheets on which the toner image has been formed is provided.

According to the above-mentioned image forming apparatus, the surface of the photoreceptor 1 is electrified uniformly to about −900 V by the electrifying charger 2, and an image is exposed on the electrified area based on image information from the image exposing apparatus 3 so that an electrostatic latent image is formed on the photoreceptor 1. As mentioned before, at this time the surface potential of the exposed area of the photoreceptor 1 is attenuated to about −100 V, and the surface potential of the unexposed area is maintained in about −900 V. Thereafter, the toner particles (negatively electrified toner particles) are allowed to adhere to the photoreceptor 1 in the developing apparatus 4 according to the electrostatic latent image, and the electrostatic latent image is developed to become a visible toner image.

As for the developing apparatus 4, the surface of the developing roller 41 has bristle of a magnetic brush form containing toner of a developer DV, and the developing roller 41 is driven to rotate to the counterclockwise direction in the drawing, and the electrostatic latent image is developed under applying a developing bias (here, −350 V). At this time, the toner is supplied with sufficient electric charges (here, negative electric charges) required for developing the electrostatic latent image on the photoreceptor 1.

The toner image formed in such a manner is moved to a transfer area Q where the transfer apparatus S exists with the rotation of the photoreceptor 1.

Meanwhile, the image receiving sheet S is drawn out of the image receiving sheet supply section, not shown, and is carried to the transfer area Q by the sheet carrying roller pair F1.

The toner image on the photoreceptor 1 is transferred to the image receiving sheet S carried to the transfer area Q by the transfer apparatus 5. This toner image transfer is carried out mainly by electrostatic transfer of the toner on the toner image to the recessed portions R on the uneven surface s2' of the image receiving sheet (see FIG. 5). After the toner image is transferred, the developer which remains on the photoreceptor 1 is removed by the blade 61. After the toner image is transferred, the electric charges which remain on the photoreceptor 1 are eliminated by the destaticizer 7.

Most of the toner particles T transferred to the image receiving sheet S adhere to the recessed portions R, but some toner particles adhere also to the protrusions P. In order to remove the toner T' adhering to the protrusions P, the image receiving sheet S on which the toner image has been transferred is carried to the protrusion cleaning apparatus 9, and the toner particles T which adhere to the protrusions P are collected to the protrusion cleaning roller 91 by the mirror image force to be peeled from the protrusions P (see also FIG. 6). In such a manner, the toner on the protrusions is removed. The removed toner returns to the developing apparatus 4 and may be reused.

The toner image receiving sheet S where the toner image is formed and the toner on the protrusions is removed is fed to the electric charge reducing apparatus 10.

The operation of the electric charge reducing apparatus 10 will be detailed below.

Figure 7:
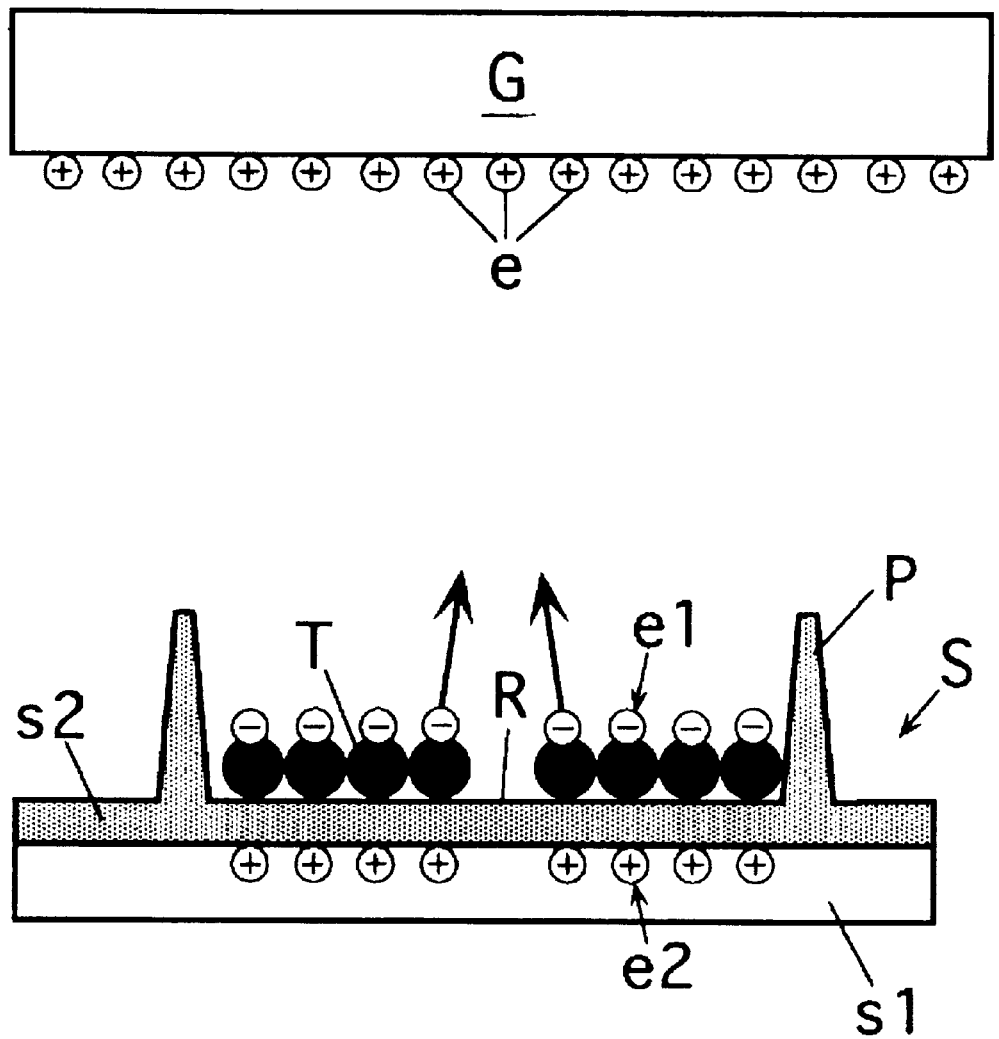
FIG. 7 is a view showing a state where the toner of the image receiving sheet formed with the toner image adheres to the image receiving sheet, and a view explaining a toner image holding state on the image receiving sheet.
Figure 8:
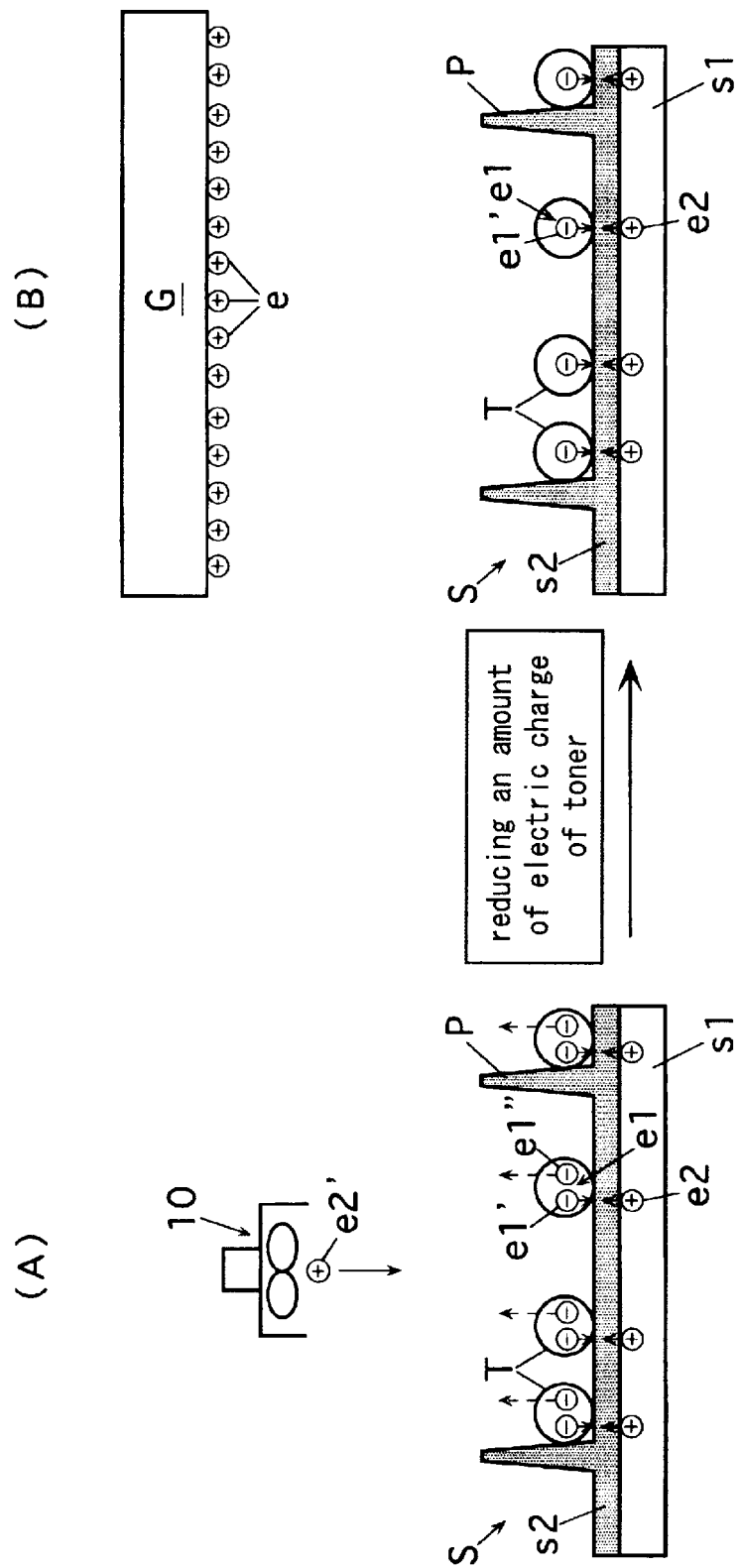
FIG. 8 is a pattern diagram showing a state where the toner of the image receiving sheet formed with the toner image adheres to the image receiving sheet.

FIGS. 7 and 8 are pattern diagrams showing the state where the toner T of the image receiving sheet S formed with the toner image adheres to the image receiving sheet S. FIG. 7 is a view explaining the toner image holding state on the image receiving sheet S. Moreover, FIG. 8(A) shows the state where the toner adheres to the image receiving sheet S on which the toner image has been transferred, and FIG. 8(B) shows the state where the toner adheres to the image receiving sheet S where the electric charges of the toner are reduced.

As shown in FIG. 7, when the chargeable toner T is allowed to removably adhere to the recessed portions R of the image receiving sheet S by an electrostatic force and the toner image is formed on the image receiving sheet S, sufficient electric charges e1 (here, negative electric charges) required for developing an electrostatic latent image on the photoreceptor 1 are given to the toner T as mentioned before prior to the adhesion of the toner T to the image receiving sheet S. The toner T on the image receiving sheet S after the adhesion is held on the image receiving sheet S by the electric charges e1 of the toner and electric charges e2 given to the image receiving sheet S by the transfer apparatus 5 at the time of transferring to the image receiving sheet.

However, when an object having electric charges (for example, a sheet G electrified with positive static electricity e), which is occasionally allowed to approach from the outside, is made to be close to the surface of the image receiving sheet S, the toner T is attracted to the sheet G electrified with static electricity e and occasionally peeled from the toner image on the image receiving sheet S. It is considered that this phenomenon occurs because the electrostatic attraction between the toner T and the approaching sheet G is stronger than the electrostatic attraction between the toner T and the image receiving sheet S.

It is considered that this phenomenon is caused because, as shown in FIG. 8(A), "since the electric charges e1 are sufficiently applied to the toner T prior to the adhesion of the toner T to the image receiving sheet S and the toner T has the electric charges e1" which exceed electric charges e1' required for electrostatic adhesion force for allowing the toner T to the image receiving sheet S, the electric charges e1 of the toner T are not balanced with the electric charges e2 of the image receiving sheet S due to the electric charges e1" which exceed the electric charges e1' required for the electrostatic attraction (adhesion force) of the toner T to the image receiving sheet S, so that the toner T is attracted to the sheet G electrified with static electricity e".

In the ion generating apparatus 10 as one example of the electric charge reducing apparatus, in order to remove all or a part of the electric charges e1" which exceed the electric charges e1' required for the electrostatic attraction (adhesion force) of the toner T to the image receiving sheet S, ions having opposite polarity to the electrifying polarity of the chargeable toner T (here, plus ion) e2' are strewed from the ion generating apparatus 10 to the surface of the image receiving sheet S where the toner image has been formed. In such a manner, as shown in FIG. 8(B), the electric charges e1" which exceed the electric charges e1' required for the electrostatic attraction (adhesion force) between the toner T and the image receiving sheet S can be eliminated or reduced. As a result, an amount of electric charges of the toner T on the image receiving sheet S can be reduced, and furthermore the electric charges e1 of the toner T hardly react to the sheet G electrified with the static electricity e towards the image receiving sheet S.

The surface potential of the image receiving sheet S, where the toner image is formed and an amount of electric charges of the toner is reduced, is preferably close to 0 V (a potential in the state where the electric charges of the toner on the image receiving sheet is balanced with the electric charges of the image receiving sheet), and the ion generating apparatus 10 reduces the surface potential of the image receiving sheet S formed with the toner image to not more than 100 V with absolute value.

In order to remove the electric charges e1", instead of the ion generating apparatus 10, the above-mentioned discharge electrically conductive sheet, the electrically conductive roller or various chargers may be adopted.

Figure 9:
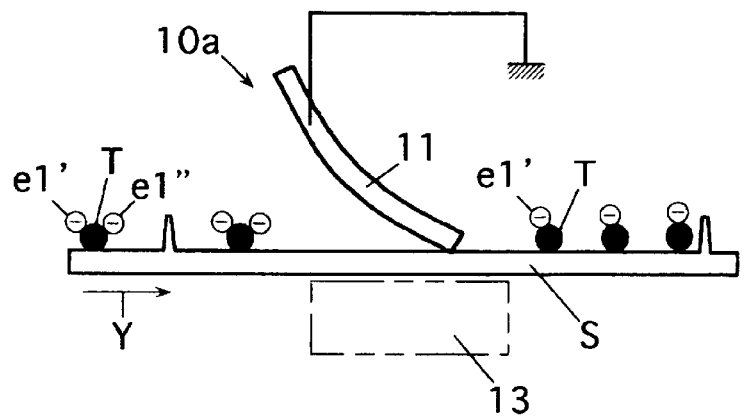
FIG. 9 is a side view showing another example of a schematic structure of an electric charge reducing apparatus: FIG. (A) shows the apparatus including an electrically conductive sheet (including film)
Figure 9:
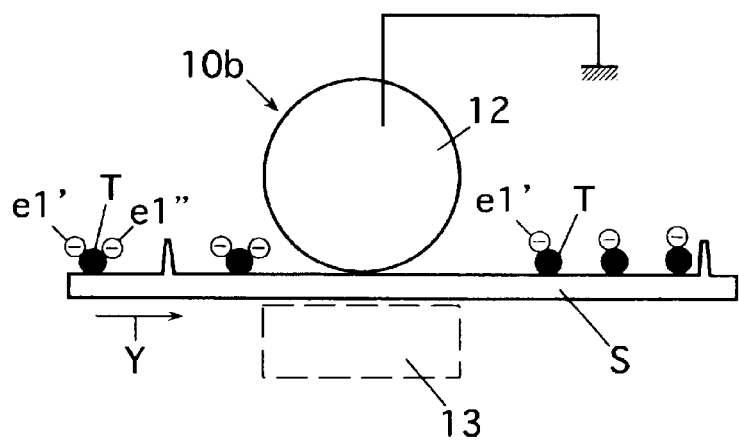
Figure 9:
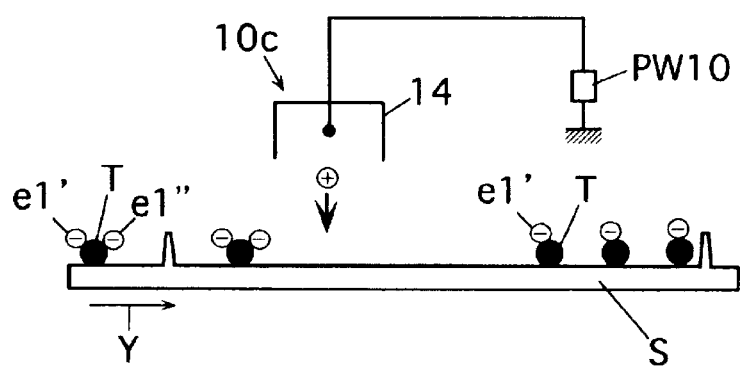

FIG. 9 is a side view showing a schematic structure of another example of the electric charge reducing apparatus. FIG. 9(A) shows an apparatus 10a including an electrically conductive sheet (including film) 11, FIG. 9(B) shows an apparatus 10b including the electrically conductive roller 12, and FIG. 9(C) shows an apparatus 10c including an electrifying charger 14 including an electrically conductive wire.

According to the apparatuses 10a and 10b shown in FIGS. 9(A) and 9(B), the electrically conductive sheet 11 and the electrically conductive roller 12 are electrically grounded and are brought into contact with the image receiving sheet S to be carried. As a result, the electric charges e1" which exceed the electric charges e1' required for the electrostatic attraction (adhesion force) between the toner T and the image receiving sheet S are eliminated or reduced, so that an amount of the electric charges of the toner T on the image receiving sheet S can be reduced.

In the apparatuses 10a and 10b, in order to bring the image receiving sheet S into contact with the electrically conductive sheet 11 or the electrically conductive roller 12 more securely, an image receiving sheet pressing member 13 which is countered to the sheet 11 or the roller 12 via the image receiving sheet S may be provided.

According to the apparatus 10c shown in FIG. 9(C), a predetermined DC voltage is applied from a power source PW10 to the electrifying charger 14, and electric charges (here, positive electric charges) are given to the surface of the image receiving sheet S to be carried. As a result, the electric charges e1" which exceed the electric charges e1' required for the electrostatic attraction (adhesion force) between the toner T and the image receiving sheet S are eliminated or reduced, so that an amount of the electric charges of the toner T on the image receiving sheet S can be reduced.

Here, the electric charge reducing apparatus 10 is provided on the downstream side with respect to the protrusion toner removal apparatus 9 in the image receiving sheet carrying direction Y, but instead of or together with the electric charge reducing apparatus 10, an electric charge reducing apparatus may be provided on a downstream side with respect to the toner image forming area (herein, transfer area) Q and on the upstream side with respect to the protrusion toner removal apparatus 9.

The image receiving sheet S where an amount of the electric charges of the toner S is reduced is discharged from the electric charge reducing apparatus 10 onto the discharge tray, not shown.

In the case where the image receiving sheet S on which the toner image has been formed completes its function and is again used, the toner is separated to be removed from the image receiving sheet S on which the toner image has been formed by the toner separation/removal apparatus, mentioned later, so that this image receiving sheet is reused as an image receiving sheet on which a toner image is not formed.

Examples of the toner separation/removal apparatus is a well-known magnetic brush apparatus where a carrier exists on a normal magnetic roller, and a fur brush apparatus including a collecting brush roller. In any case, the toner particles which adhere to the recessed portions on the uneven surface of the image receiving sheet are collected by the brush.

Such a toner separation/removal apparatus may be provided on the upstream side in the image receiving sheet carrying direction Y with respect to the toner image forming area (here, transfer area) Q on the image receiving sheet by the toner image forming apparatus 100 in the image forming apparatus of FIG. 1.

Figure 10:
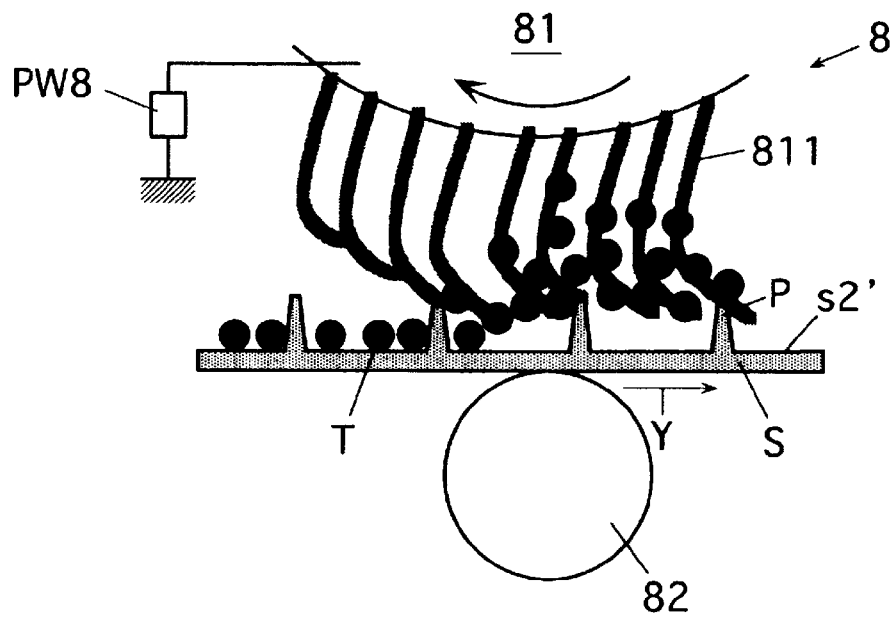
FIG. 10 is a view showing a state where the toner adhering to the recessed portions on the uneven surface of the image receiving sheet is separated and removed by a fur brush apparatus including a collecting brush roller as one example of a toner separation/removal apparatus.

FIG. 10 shows the state where the toner T which adheres to the recessed portions R on the uneven surface s2' of the image receiving sheet is separated to be removed by a fur brush apparatus 8 including a collecting brush roller 81 as one example of the toner separation/removal apparatus.

In this fur brush apparatus 8, the collecting brush roller 81 is driven to rotate to the clockwise direction in the drawing by a drive device, not shown, and a bias of about +300 V to +500 V having opposite polarity to the electrifying polarity of the toner particles is applied from a power source PW8. Moreover, the counter roller 82 is electrically grounded. As a result, electric charges for separating to remove the toner can be supplied to the image receiving sheet S.

According to this fur brush apparatus 8, the bias for separating to remove the toner is applied from the power source PW8 to the collecting brush roller 81. The collecting brush roller 81 mechanically slides along the image formed surface of the image receiving sheet S by a fur brush (fiber brush) 811, and moves the toner T which adheres to the recessed portions R on the uneven surface s2' of the image receiving sheet towards the brush roller 81 side using the electrostatic force to separate to remove the toner. The removed toner T is reused. In the case where the toner separation/removal apparatus is provided in the image forming apparatus, the toner which is separated and removed may be returned to the developing apparatus 4 to be reused.

In the case where the recessed portion on the uneven surface of the image receiving sheet are continues groove bar recessed portions, the continuous groove recessed portions are preferably as shown in this embodiment of FIG. 3(B), and they preferably extend to the sheet carrying direction Y as shown in FIGS. 3(D), 3(E) and 3(F) so that the fiber brush or the like rakes off the toner smoothly along the continues groove bar recessed portions of the image receiving sheet so as to separate and remove the toner easily. As mentioned before, in order to facilitate the explanation, FIG. 10 shows an image receiving sheet which has the uneven pattern shown in FIG. 3(A), namely, where the recessed portions R and the protrusions P are formed parallel with the direction X intersecting perpendicularly to the sheet carrying direction Y instead of the image receiving sheet of FIG. 3(B).

According to the above-mentioned non-fixing type image forming apparatus described above, the image receiving sheet S which has the uneven surface s2' formed with a lot of recessed portions R capable of housing the chargeable toner T is used as the image receiving sheet S on which an image is formed, and the chargeable toner T is allowed to removably adhere to the recessed portions R on the uneven surface s2' of the image receiving sheet to form a toner image. The toner T which adheres to the recessed portions R is protected by the protrusions P on the uneven surface s2' of the image receiving sheet.

Therefore, although the formed toner image S is simply allowed to adhere to the image receiving sheet S and is not fixed by heating or the like in the conventional image forming methods, the toner T in the recessed portions R is protected sufficiently as long as a special external force or a toner removing function is not applied, so that a required toner image state can be maintained. In the case where the toner image on the image receiving sheet S is viewed and the image receiving sheet S is stored and is simply moved, a weak external force is applied to the image receiving sheet S in such a manner that the image receiving sheets contact with each other or fingers lightly contact with the image receiving sheet S, but such an external force does not cause disadvantages such as remarkable disorder of the toner image and adhesion of the toner to a rear face of an overlapped image receiving sheet.

Furthermore, since the toner T simply adheres to the image receiving sheet S removably, it can be separated from the image receiving sheet S, and the toner T removed in such a manner or (and) the image receiving sheet S from which the toner has been removed can be reused.

In addition, the electrostatic toner T can be fixed, but hot-melt toner which can be thermally fixed, for example, is not necessarily used. Therefore, a hard material can be used as the toner material, and thus long-life toner with less deformation, abrasion, fusion and the like can be adopted.

Further, since an amount of electric charges of the toner T on the image receiving sheet S formed with the toner image is reduced, the electric charges e1" which exceed the electric charges e1' required for the electrostatic attraction (adhesion force) between the toner T and the image receiving sheet S can be eliminated or reduced. As a result, the electric charges e1 of the toner T hardly reacts to the object G having electric charges e which possibly approaches from the outside towards the image receiving sheet S. For example, even if the image receiving sheet S on which the toner image is formed is overlapped with another image receiving sheet electrified with static electricity or the image receiving sheet S on which the toner image is formed is filed in a file electrified with static electricity, the toner T is hardly peeled from the toner image on the image receiving sheet S.

Evaluation Experimental Example of Peeling Characteristics of Toner from Image

As for the image receiving sheet on which the toner image is formed by the image forming method an the image forming apparatus of the present invention, a relationship between peeling of toner from the toner image (toner separated amount) and a surface potential (V) of the image receiving sheet observed when an amount of ions to be strewed was changed was studied. This will be explained below.

The experiment was carried out by using the image forming apparatus show in FIG. 1 in the following manner.

After the toner image was formed, an ion blow was given to the image formed surface of the image receiving sheet of which protrusions were cleaned, and the surface potential of the image receiving sheet was measured. At this time, the output of the ion blow was changed variously so that the surface potential of the image receiving sheet was changed.

After the toner image was formed in such a manner, an insulating film for measuring a toner separated amount of which surface potential was changed by an electrifying charger capable of electrifying with opposite polarity to the electrifying polarity of the toner was brought into contact with the image receiving sheet of which surface potential was changed after cleaning the protrusions, and they were overlapped with each other. Thereafter, they were separated, an amount of toner (a weight of toner) transferred from the image receiving sheet to the insulating film was measured, a rate (weight % [wt %]) of a weight of toner (toner separating (transfer) amount) transferred from the image receiving sheet to the insulating film with respect to the entire toner weight on the image receiving sheet was checked.

There will be explained below the image receiving sheet used for the experiment. The above-mentioned image receiving sheet S was used for the experiment.

Namely, the thermoplastic resin (high-density polyethylene resin) sheet was overlapped with the sheet core layer s1 made of paper so that the shaping die is contacted with the resin side, and they were sandwiched by a metal plate and were pressed (pressed for 30 minutes at temperature of 150° C. and with pressure of $9.80665 \times 10^5$ Pa (10 kg/cm$^2$). Thereafter, they were cooled, and the sheet core layer s1 and the polyethylene resin sheet were separated from the shaping die, so that the surface shape of the shaping die was transferred onto the polyethylene resin sheet, and the image receiving sheet was produced. In this image receiving sheet, the uneven surface s2' having uneven shape made of polyethylene resin is formed on the paper sheet s1. The image receiving sheet obtained in such a manner is, hereinafter, called as "polyethylene image receiving sheet".

In this polyethylene image receiving sheet, the width D of the continuous groove type recessed portions R on the uneven surface s2' formed by the uneven layer s2 was approximately 100 $\mu$m. The height H of the protrusions P (in other words, the depth of the recessed portions) was approximately 60 $\mu$m. Moreover, the width W of the protrusions P was approximately 15 $\mu$m. Further, the minimum thickness of the uneven layer s2 (the thickness of the bottom face portions of the recessed portions on the uneven layer s2) was about 10 $\mu$m.

In addition, the epoxy resin was poured into the shaping die made of a silicone rubber material, and the sheet s1 coated with resin was overlapped thereon, and they were sandwiched by a metal plate, and after they were left for a long time, the metal plate was removed so that an image receiving sheet was produced. In this image receiving sheet, the uneven surface s2' having an uneven shape was formed by epoxy resin. The image receiving sheet obtained in such a manner is called, hereinafter, as "epoxy image receiving sheet".

In this epoxy image receiving sheet, the width D of the continuous groove type recessed portions R on the uneven surface s2' formed by the uneven layer s2 was approximately 150 $\mu$m, the height H of the protrusions P (in other words, the depth of the recessed portions) was approximately 50 $\mu$m, and the width W of the protrusions P was approximately 20 $\mu$m. Moreover, the minimum thickness of the uneven layer s2 (the thickness of the bottom face portions of the recessed portions on the uneven layer s2) was about 15 $\mu$m.

There will be explained below the details of the experiment.

Firstly, in the image forming apparatus shown in FIG. 1, after a toner image was formed by the toner image forming apparatus 100, the electric charge reducing operation by means of the ion generating apparatus 10 was not performed, and the image receiving sheet on which the toner image was formed (polyethylene image receiving sheet, epoxy image receiving sheet) was discharged directly. In this case, the surface potential of the sheet on which an image was placed was about −150 V in the case of the epoxy image receiving sheet, and was about −180 V in the case of the polyethylene image receiving sheet. When a lot of experimental data were averaged, these values were obtained. They were comparative experiment example.

Next, in order to ensure the effect of the electric charge reducing operation, an evaluation experiment was carried out.

Similarly to the comparative example, in the image forming apparatus of FIG. 1, ions were strewed over the image receiving sheet on which the toner image was formed by the ion generating apparatus 10, and the electric charge reducing operation was performed. At this time, the surface potential of the image receiving sheet was changed by changing the time at which the ions were strewed.

In this evaluation example, the time of strewing the ions was 2 seconds and 60 seconds. As a result, the surface potential on the image receiving sheets (polyethylene image receiving sheet, epoxy image receiving sheet), which was about −150 V to −180 V in the comparative example, was −90 V (example 2) when the ion strewing time was 2 seconds and was 0 V to −20 V when the ion strewing time was 60 seconds (polyethylene image receiving sheet: 0 V to −10 V, the epoxy image receiving sheet 0V to −20 V) (experiment example 1).

Next, a separated amount (transfer amount) of toner from the image receiving sheet (polyethylene image receiving sheet, epoxy image receiving sheet) to the insulating film for measuring the toner separated amount was measured. There will be explained below its measuring method with reference to FIG. 11.

Figure 11:
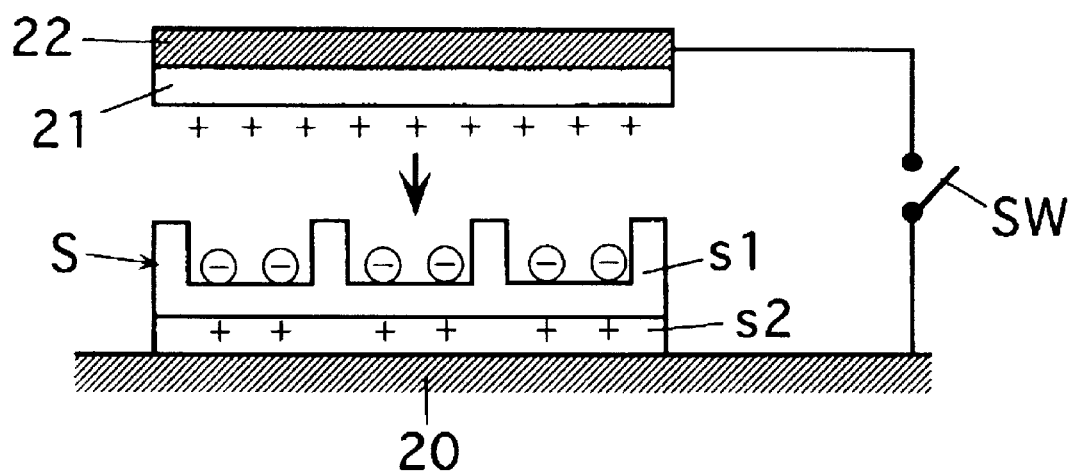
FIG. 11 is a view explaining a method of measuring an amount of the toner (transfer amount) separated from the image receiving sheet to an insulating film for measuring a toner separated amount.

As shown in FIG. 11, the image receiving sheet S on which the toner image has been transferred is arranged on a metal plate 20. The insulating film 21 for measuring the toner separated amount lined with an electrified electrode layer 22 is overlapped with the image receiving sheet S arranged on the metal plate 20. The electrode layer 22 is electrically connected with the metal plate 20 via a switch SW. The electrode layer 22 and the meal plate 20 are electrically grounded and left with a little pressure being applied to the insulating film overlapped with the image receiving sheet S. Thereafter, the image receiving sheet S and the insulating film 21 are peeled slowly, and a weight of the separated (transferred) toner which adhere to the insulating film 21 is measured.

Figure 12:
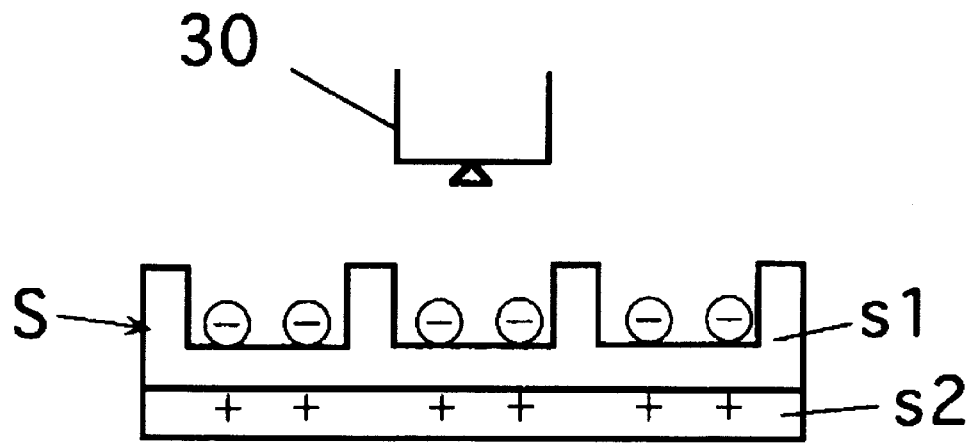
FIG. 12 is a view showing a measuring state of a surface potential on the image receiving sheet.

In this experiment, as for the image receiving sheets (polyethylene image receiving sheet, epoxy image receiving sheet) of which surface potential was 0 V to −20 V (example 1), −90 V (example 2) and −150 V to −180 V (comparative example), the electric potential of the insulating film for measuring a toner separated amount was changed from +100 V up to +800 V step by step by each 100 V, and a toner adhering amount from the image receiving sheet to the insulating film (separated (transferred) toner weight) was measured for each electric potential. The surface potential of the image receiving sheet was measured by a surface potential measuring apparatus 30 as shown in FIG. 12.

The results of the examples 1 and 2 are shown in the following Tables 1 and 2, respectively and the result of the comparative example is shown in the following Table 3.

TABLE 1

(experiment example 1)

| polyethylene image receiving sheet The electric charge reducing operation is performed. (60 sec) | | | | | epoxy image receiving sheet The electric charge reducing operation is performed. (60 sec) | | | | |
|---|---|---|---|---|---|---|---|---|---|
| surface potential of image receiving sheet (V) | surface potential of insulating film for measuring a toner separated amount (V) | rate of the toner separation (wt %) | visually inspected evaluation of the toner separated state | surface potential of image receiving sheet after blowing toner off by air (V) | surface potential of image receiving sheet (V) | surface potential of insulating film for measuring a toner separated amount (V) | rate of the toner separation (wt %) | visually inspected evaluation of the toner separated state | surface potential of image receiving sheet after blowing toner off by air (V) |
| average 0~−10 | +100 | 0.0 | ○ | average +20 | average 0~−20 | +100 | 0.0 | ○ | average +140 |
|  | +200 | 0.0 | ○ |  |  | +200 | 0.0 | ○ |  |
|  | +300 | 0.0 | ○ |  |  | +300 | 0.0 | ○ |  |
|  | +400 | 0.0 | ○ |  |  | +400 | 0.0 | ○ |  |
|  | +500 | 0.0 | ○ |  |  | +500 | 0.0 | ○ |  |
|  | +600 | 0.0 | ○ |  |  | +600 | 0.0 | ○ |  |

TABLE 1-continued (experiment example 1)

| polyethylene image receiving sheet<br>The electric charge reducing operation is performed. (60 sec) | | | | | epoxy image receiving sheet<br>The electric charge reducing operation is performed. (60 sec) | | | | |
|---|---|---|---|---|---|---|---|---|---|
| surface potential of image receiving sheet (V) | surface potential of insulating film for measuring a toner separated amount (V) | rate of the toner separation (wt %) | visually inspected evaluation of the toner separated state | surface potential of image receiving sheet after blowing toner off by air (V) | surface potential of image receiving sheet (V) | surface potential of insulating film for measuring a toner separated amount (V) | rate of the toner separation (wt %) | visually inspected evaluation of the toner separated state | surface potential of image receiving sheet after blowing toner off by air (V) |
| | +700 | 0.4 | ○ | | | +700 | 0.0 | ○ | |
| | +800 | 0.6 | ○ | | | +800 | 0.5 | ○ | |

TABLE 2

(experiment example 2)

| polyethylene image receiving sheet<br>The electric charge reducing operation is performed. (2 sec) | | | | | epoxy image receiving sheet<br>The electric charge reducing operation is performed. (2 sec) | | | | |
|---|---|---|---|---|---|---|---|---|---|
| surface potential of image receiving sheet (V) | surface potential of insulating film for measuring a toner separated amount (V) | rate of the toner separation (wt %) | visually inspected evaluation of the toner separated state | surface potential of image receiving sheet after blowing toner off by air (V) | surface potential of image receiving sheet (V) | surface potential of insulating film for measuring a toner separated amount (V) | rate of the toner separation (wt %) | visually inspected evaluation of the toner separated state | surface potential of image receiving sheet after blowing toner off by air (V) |
| average −90 | +100 | 0.0 | ○ | average +30 | average −90 | +100 | 0.0 | ○ | average +145 |
| | +200 | 0.0 | ○ | | | +200 | 0.0 | ○ | |
| | +300 | 0.0 | ○ | | | +300 | 0.0 | ○ | |
| | +400 | 0.0 | ○ | | | +400 | 0.0 | ○ | |
| | +500 | 1.8 | ○ | | | +500 | 0.0 | ○ | |
| | +600 | 2.9 | Δ | | | +600 | 0.0 | ○ | |
| | +700 | 4.5 | Δ | | | +700 | 0.7 | ○ | |
| | +800 | 7.3 | Δ | | | +800 | 1.1 | ○ | |

TABLE 3

(comparative experiment example)

| polyethylene image receiving sheet<br>The electric charge reducing operation is not performed. | | | | | epoxy image receiving sheet<br>The electric charge reducing operation is not performed. | | | | |
|---|---|---|---|---|---|---|---|---|---|
| surface potential of image receiving sheet (V) | surface potential of insulating film for measuring a toner separated amount (V) | rate of the toner separation (wt %) | visually inspected evaluation of the toner separated state | surface potential of image receiving sheet after blowing toner off by air (V) | surface potential of image receiving sheet (V) | surface potential of insulating film for measuring a toner separated amount (V) | rate of the toner separation (wt %) | visually inspected evaluation of the toner separated state | surface potential of image receiving sheet after blowing toner off by air (V) |
| average −180 | +100 | 2.7 | Δ | average +15 | average −150 | +100 | 0.6 | ○ | average +150 |
| | +200 | 5.2 | Δ | | | +200 | 1.7 | ○ | |
| | +300 | 8.4 | x | | | +300 | 2.1 | Δ | |
| | +400 | 12.7 | x | | | +400 | 4.6 | Δ | |
| | +500 | 15.1 | x | | | +500 | 7.5 | Δ | |
| | +600 | 18.0 | x | | | +600 | 8.4 | x | |
| | +700 | 19.8 | x | | | +700 | 9.8 | x | |
| | +800 | 25.0 | x | | | +800 | 10.4 | x | |

Visually inspected evaluations of the toner separated state in Tables 1 to 3 are defined as follows.

○: separation of toner is not recognized.
(when a separated amount is not less than 0 wt % to not more than 2.0 wt %)

Δ: slight separation of toner is recognized but this does not become a problem for the use.
(when the separated amount exceeds 2.0 wt % and is not more than 8.0 wt %)

X: separation of toner can be checked visually.
(when the separated amount exceeds 8.0 wt %)

Figure 13:
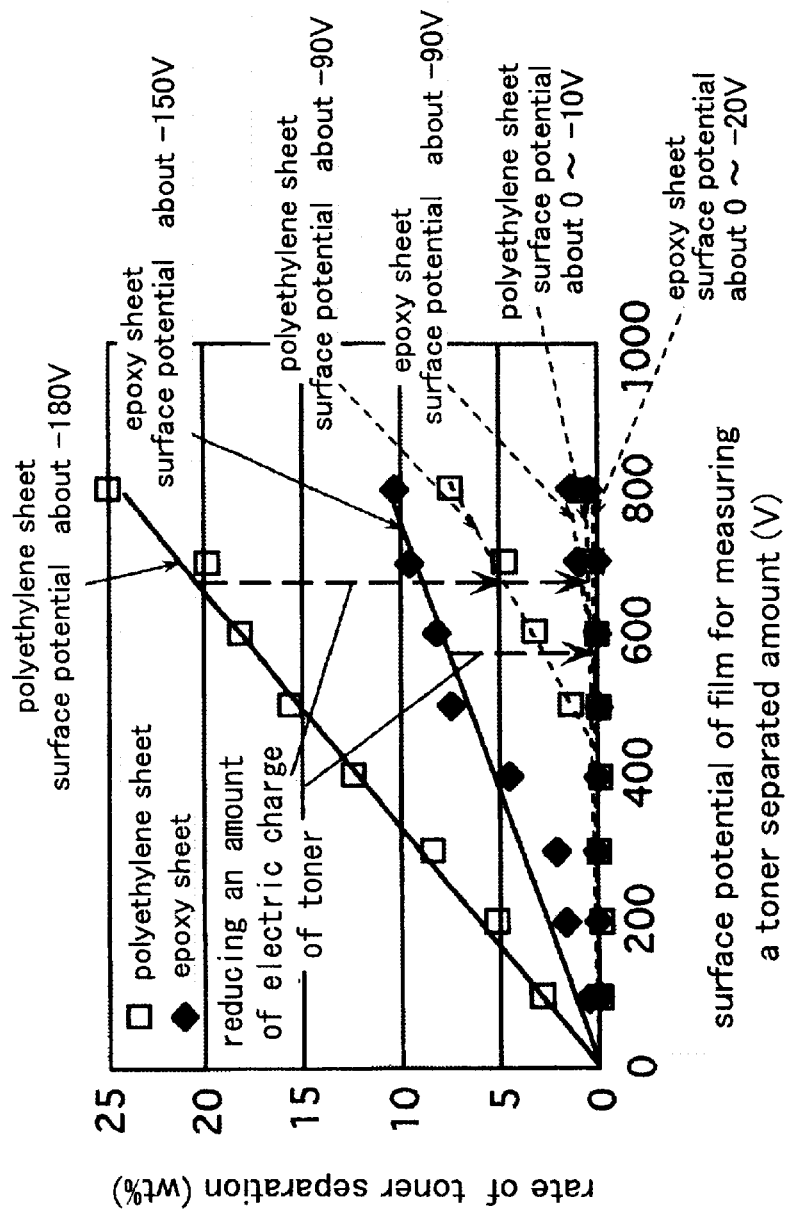
FIG. 13 is a graph showing a relationship between the surface potential of the insulating film for measuring a toner separated amount and a toner separating (transfer) rate as for a polyethylene image receiving sheet and an epoxy image receiving sheet.

FIG. 13 is a graph showing the experimental results.

FIG. 13 is a graph showing a relationship between the surface potential of the insulating film for measuring a toner separated amount and a rate of the toner separation (transfer) for the polyethylene image receiving sheet and the epoxy image receiving sheet. This graph shows a voltage dependency of the toner separation (transfer) rate with respect to the surface potential of the insulating film.

According to the results shown in FIG. 13, it is found that the toner separation (transfer) rate becomes less as the surface potential of the image receiving sheet is closer to 0 V after the toner image is transferred.

The present inventors consider that this phenomenon occurs mainly because an amount of electric charges of the toner on the image receiving sheet is reduced. The present inventors made the following experiment in order to ensure this.

As mentioned before, after the toner image on the photoreceptor was transferred onto the image receiving sheet, the electric potential of the image receiving sheet on which the toner image was formed was measured. As a result, the electric potentials of both the polyethylene image receiving sheet and the epoxy image receiving sheet were −150 V to −180 V.

Figure 14:
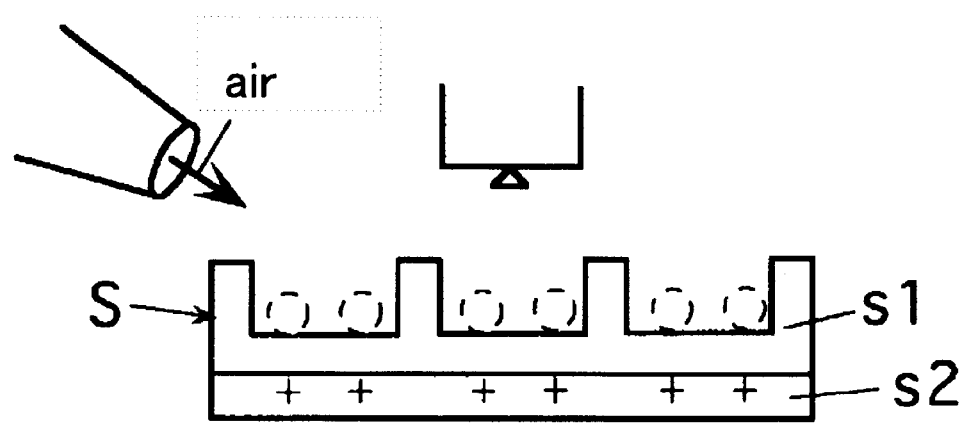
FIG. 14 is a view showing a state where the toner on the image receiving sheet is blown off by air.

Thereafter, as shown in FIG. 14, the toner on the image receiving sheet was blown off by air, similarly the surface potentials were measured. The surface potential of the epoxy image receiving sheet was +150 V, and the surface potential of the polyethylene image receiving sheet was +15 V. It is considered that a difference in the values is due to a difference in the thickness of the surface layer s2 of the image receiving sheets and permittivity of the materials.

In the case where the potential reducing operation was performed by the electric charge reducing apparatus and the surface potential of the image receiving sheet on which the toner image was transferred was reduced to −90 V or 0 V to −20 V, similarly to the aforementioned case, after the toner on the image receiving sheet was blown off by air, and the surface potential was measured. As a result, the electric potential similar to the case where the electric potential reducing operation was not performed, was obtained, namely, the electric potential was +140 V to +145 V for the epoxy image receiving sheet, and +20 V to +30 V for the polyethylene image receiving sheet. Therefore, it is considered that even if the electric potential reducing operation by the electric charge reducing apparatus strews ions over the image receiving sheet after the toner image is transferred to reduce the surface potential of the image receiving sheet, the electric potential of the image receiving sheet itself (namely, the image receiving sheet after the toner is blown off by air) is not attenuated, and this operation mostly attenuates an amount of the electric charges of the toner particles.

According to such a result, it is considered that the electric potential reducing operation by means of the electric charge reducing apparatus preferably reduces an amount of the electric charges of toner. It can be considered that the adhesion force between the toner on the image receiving sheet on which the toner image has been formed and the image receiving sheet is increased by performing the electric potential reducing operation.

The toner separation (transfer) rate is in the acceptable range of about 0 wt % to 8 wt %. Therefore, after the toner image is formed on the image receiving sheet, it is preferable that the surface potential of the image receiving sheet becomes not more than about 100 V with an absolute value by the electric charge reducing operation.

As mentioned above, the present invention can provide the non-fixing type image forming method of forming a toner image on an image receiving sheet which holds the toner image onto the image receiving sheet removably without fixing it like conventional techniques so as to be capable of forming an image, and thus separates and removes the toner from the image receiving sheet on which the toner image is formed to enable reusing of the toner or (and) the image receiving sheet, and is capable of forming the toner image remaining on the image receiving sheet onto the image receiving sheet stably with a damage of the image due to an object having electric charges (for example, a sheet having electric charges) which occasionally approaches from an outside being suppressed.

In addition, the present invention can provide the non-fixing type image forming apparatus which is suitable for carrying out the non-fixing type image forming method of the present invention.

Although the present invention has been fully described by way of examples with reference to the accompanying drawings, it is to be noted that various changes and modifications will be apparent to those skilled in the art. Therefore, unless such changes and modification depart from the scope of the present invention, they should be construed as being included therein.

What is claimed is:

1. A non-fixing type image forming method of forming a toner image on an image receiving sheet comprising the steps of:

allowing a chargeable toner to removably adhere to a recessed portions on an uneven surface of the image receiving sheet by means of an electrostatic force to form the toner image, said image receiving sheet have the uneven surface formed with a lot of recessed portions capable of housing chargeable toner as the image receiving sheet, and reducing an amount of electric charges of the toner on the image receiving sheet after forming the toner image on the image receiving sheet.

2. A non-fixing type image forming method of forming a toner image on an image receiving sheet according to claim 1, wherein protrusions on the uneven surface of the image receiving sheet protect the toner adhering to the recessed portions.

3. A non-fixing type image forming method of forming a toner image on an image receiving sheet according to claim 1, wherein the reducing an amount of electric charges of the toner on the image receiving sheet includes a reducing a surface potential of the image receiving sheet to not more than 100 V with absolute value after forming the toner image on the image receiving sheet.

4. A non-fixing type image forming method of forming a toner image on an image receiving sheet according to claim 1, wherein the reducing an amount of electric charges of the toner on the image receiving sheet includes a reducing a surface potential of the image receiving sheet to not more than 20 V with absolute value after forming the toner image on the image receiving sheet.

5. A non-fixing type image forming method of forming a toner image on an image receiving sheet according to claim 1, wherein the reducing an amount of electric charges of the toner on the image receiving sheet is a charging the image receiving sheet or the toner with charge having opposite polarity to an electrifying polarity of the chargeable toner.

6. A non-fixing type image forming method of forming a toner image on an image receiving sheet according to claim 1 further comprising the step of:

removing the toner adhering to top portions of protrusions on the uneven surface of the image receiving sheet after forming the toner image on the image receiving sheet.

7. A non-fixing type image forming method of forming a toner image on an image receiving sheet according to claim 6, wherein the reducing an amount of electric charges of the toner on the image receiving sheet is performed before the removing the toner adhering to top portions of protrusions on the uneven surface of the image receiving sheet.

8. A non-fixing type image forming method of forming a toner image on an image receiving sheet according to claim 6, wherein the reducing an amount of electric charges of the toner on the image receiving sheet is performed after the removing the toner adhering to top portions of protrusions on the uneven surface of the image receiving sheet.

9. A recycling method of a image receiving sheet formed a non-fixing type toner image comprising the steps of:

allowing a chargeable toner to removably adhere to a recessed portions on an uneven surface of the image receiving sheet by means of an electrostatic force to form the toner image, said image receiving sheet have the uneven surface formed with a lot of recessed portions capable of housing chargeable toner as the image receiving sheet;

reducing an amount of electric charges of the toner on the image receiving sheet after forming the toner image on the image receiving sheet, and removing the chargeable toner from the image receiving sheet.

10. A non-fixing type image forming apparatus comprising:

toner image former for allowing chargeable toner to removably adhere to recessed portions of an image receiving sheet having an uneven surface formed with a lot of recessed portions capable of housing the chargeable toner by means of an electrostatic force to form the toner image on the image receiving sheet, and electric charge reducing device for reducing an amount of electric charges of the toner on the image receiving sheet after forming the toner image, said electric charge reducing device is provided on a downstream side in an image receiving sheet carrying direction with respect to a toner image forming area on the image receiving sheet by the toner image former.

11. A non-fixing type image forming apparatus according to claim 10 further comprising:

toner removal device for removing the toner adhering to top portions of protrusions on the uneven surface of the image receiving sheet, said toner removal device is provided on the downstream side in the image receiving sheet carrying direction with respect to the toner image forming area on the image receiving sheet by the toner image former, wherein the electric charge reducing device is provided on the downstream side in the image receiving sheet carrying direction with respect to the toner image forming area and on an upstream side with respect to the toner removal device.

12. A non-fixing type image forming apparatus according to claim 10 further comprising:

toner removal device for removing the toner adhering to top portions of protrusions on the uneven surface of the image receiving sheet, said toner removal device is provided on the downstream side in the image receiving sheet carrying direction with respect to the toner image forming area on the image receiving sheet by the toner image former, wherein the electric charge reducing device is provided on a downstream side in the image receiving sheet carrying direction with respect to the toner removal device.

13. A non-fixing type image forming apparatus according to claim 10, wherein the electric charge reducing device reduces an amount of electric charges of the toner on the image receiving sheet by charging the image receiving sheet or the toner with charge having opposite polarity to an electrifying polarity of the chargeable toner.

14. A non-fixing type image forming apparatus according to claim 10, wherein reducing an amount of electric charges of the toner on the image receiving sheet is performed by the electric charge reducing device not contacting with the image receiving sheet and the toner.

15. A non-fixing type image forming apparatus according to claim 14, wherein the electric charge reducing device strews ion by means of ion flow.

16. A non-fixing type image forming apparatus according to claim 14, wherein the electric charge reducing device electrifies the image receiving sheet or the toner by an electrifying charger.

17. A non-fixing type image forming apparatus according to claim 10, wherein reducing an amount of electric charges of the toner on the image receiving sheet is performed by a conductor contacting with the image receiving sheet.

18. A non-fixing type image forming apparatus according to claim 10, wherein the electric charge reducing device reduces a surface potential of the image receiving sheet where the toner image has been formed to not more than 100 V with absolute value.

19. A non-fixing type image forming apparatus according to claim 10, wherein the electric charge reducing device reduces the surface potential of the image receiving sheet where the toner image has been formed to not more than 20 V with absolute value.

20. A non-fixing type image forming apparatus according to claim 10 further comprising:

recycling device for removing the chargeable toner from the image receiving sheet.

21. A non-fixing type image forming apparatus according to claim 20, wherein the recycling device is provided on the upstream side in the image receiving sheet carrying direction with respect to the toner image forming area.

* * * * *